(12) United States Patent
Jin

(10) Patent No.: US 8,923,638 B2
(45) Date of Patent: Dec. 30, 2014

(54) ALGORITHM SELECTION FOR STRUCTURE FROM MOTION

(71) Applicant: Adobe Systems Incorporated, San Jose, CA (US)

(72) Inventor: Hailin Jin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 143 days.

(21) Appl. No.: 13/725,006

(22) Filed: Dec. 21, 2012

(65) Prior Publication Data

US 2013/0266238 A1    Oct. 10, 2013

Related U.S. Application Data

(60) Provisional application No. 61/621,365, filed on Apr. 6, 2012.

(51) Int. Cl.
*G06K 9/36* (2006.01)
*H04N 13/00* (2006.01)
(Continued)

(52) U.S. Cl.
CPC ............... *H04N 13/00* (2013.01); *H04N 5/232* (2013.01); *H04N 17/002* (2013.01); *G06K 9/3233* (2013.01); *G06K 9/3241* (2013.01); *G06K 9/4652* (2013.01); *G06T 5/001* (2013.01); *G06T 7/0071* (2013.01); *G06T 2207/10016* (2013.01); *G06T 2207/30241* (2013.01); *G06T 2207/30244* (2013.01)
USPC ............................ 382/236; 382/295; 382/296

(58) Field of Classification Search
CPC .................. G06T 2207/10016; G06T 7/2033; G06T 7/20; G06T 7/2053; G06T 5/001; G06T 5/40; G06T 5/20; G06T 5/50; G06K 9/3233; G06K 9/00777; G06K 9/40; H04N 5/145; H04N 7/50; H04N 7/26244; H04N 7/26765; H04N 7/361; H04N 7/462

USPC ......... 382/103, 107, 165, 173, 232, 236, 243, 382/254, 256, 276, 295, 296; 375/E7.076, 375/E7.263, E7.04; 358/3.29; 348/42, 154, 348/155, 169, 415.1, 699; 345/648
See application file for complete search history.

(56) References Cited

U.S. PATENT DOCUMENTS 4,885,713 A    12/1989   Miller
5,692,063 A *  11/1997   Lee et al. ..................... 382/107
(Continued)

OTHER PUBLICATIONS

Bruce D. Lucas and Takeo Kanade. An Iterative Image Registration Technique with an Application to Stereo Vision. International Joint Conference on Artificial Intelligence, pp. 674-679, 1981.

(Continued)

*Primary Examiner* — Anh Do
(74) *Attorney, Agent, or Firm* — Wolfe-SBMC

(57) ABSTRACT

A technique for selecting a particular reconstruction technique to be applied to an image sequence. The technique may analyze an input image sequence and, based on one or more characteristics of the image sequence, select a reconstruction technique as the appropriate technique for the image sequence from among a set of reconstruction techniques. For example, the set may include two or more of a rotation-based reconstruction technique, a plane-based reconstruction technique, and a general 3D reconstruction technique. The selection technique may be combined with the reconstruction techniques to produce a system that takes as input an image sequence or a set of point trajectories, selects an appropriate reconstruction technique, and applies the selected reconstruction technique to generate an estimate of camera motion and camera intrinsic parameters for the image sequence. The technique may be adapted to select among other types of techniques that may be applied to image sequences.

21 Claims, 8 Drawing Sheets

(51) Int. Cl.
  H04N 5/232    (2006.01)
  H04N 17/00    (2006.01)
  G06K 9/32     (2006.01)
  G06K 9/46     (2006.01)
  G06T 5/00     (2006.01)
  G06T 7/00     (2006.01)

(56) References Cited

U.S. PATENT DOCUMENTS

| | | | |
|---|---|---|---|
| 5,748,789 A * | 5/1998 | Lee et al. | 382/243 |
| 5,787,203 A | 7/1998 | Lee et al. | |
| 6,760,488 B1 | 7/2004 | Moura et al. | |
| 7,177,740 B1 | 2/2007 | Guangjun et al. | |
| 7,356,082 B1 | 4/2008 | Kuhn | |
| 7,477,762 B2 | 1/2009 | Zhang et al. | |
| 8,248,476 B2 | 8/2012 | Ke et al. | |
| 8,259,994 B1 | 9/2012 | Anguelov et al. | |
| 8,437,501 B1 | 5/2013 | Anguelov et al. | |
| 8,693,734 B2 | 4/2014 | Jin | |
| 8,873,846 B2 | 10/2014 | Jin | |
| 2003/0103682 A1 | 6/2003 | Blake et al. | |
| 2010/0079598 A1 | 4/2010 | Ke et al. | |
| 2010/0142846 A1 | 6/2010 | Tolliver et al. | |
| 2010/0245593 A1 | 9/2010 | Kim et al. | |
| 2011/0007138 A1 | 1/2011 | Zhang et al. | |
| 2011/0025853 A1 | 2/2011 | Richardson | |
| 2011/0064308 A1 | 3/2011 | Stein et al. | |
| 2011/0311104 A1 | 12/2011 | Sinha et al. | |
| 2013/0044186 A1 | 2/2013 | Jin et al. | |
| 2013/0044913 A1 | 2/2013 | Jin et al. | |
| 2013/0058581 A1 | 3/2013 | Zhang et al. | |
| 2013/0230214 A1 | 9/2013 | Arth et al. | |
| 2013/0265387 A1 | 10/2013 | Jin | |
| 2013/0265439 A1 | 10/2013 | Jin | |
| 2013/0265443 A1 | 10/2013 | Jin | |
| 2013/0266179 A1 | 10/2013 | Jin | |
| 2013/0266180 A1 | 10/2013 | Jin | |
| 2013/0266218 A1 | 10/2013 | Jin | |

OTHER PUBLICATIONS

Jianbo Shi and Carlo Tomasi. Good Features to Track. IEEE Conference on Computer Vision and Pattern Recognition, pp. 593-600, 1994.

D. Nister. An efficient solution to the five-point relative pose problem. IEEE Transactions on Pattern Analysis and Machine Intelligence 26(6) 756-770, Jun. 2004.

Martin A. Fischler and Robert C. Bolles. Random Sample Consensus: A Paradigm for Model Fitting with Applications to Image Analysis and Automated Cartography. Comm. of the ACM 24 (6) (1981), pp. 381-395.

Richard Hartley and Andrew Zisserman, Multiple View Geometry, CVPR Jun. 1999. pp. 1-240.

Laurent Kneip, Davide Scaramuzza, and Roland Siegwart. A Novel Parameterization of the Perspective-Three-Point Problem for a Direct Computation of Absolute Camera Position and Orientation. In Proc. IEEE Computer Vision and Pattern Recognition, 2011. pp. 1-8.

M. Brown, R. Hartley and D. Nister. Minimal Solutions for Panoramic Stitching. In Proc. International Conference on Computer Vision and Pattern Recognition, Jun. 2007. pp. 1-8.

E. Hemayed, A survey of camera self-calibration. In Proceedings IEEE Conference on Advanced Video and Signal Based Surveillance, 2003. pp. 1-7.

Riccardo Gherardi and Andrea Fusiello, Practical Autocalibration. In Proceedings European Conference on Computer Vision, 2010. pp. 1-12.

M. Pollefeys, R. Koch and L. Van Gool. Self-Calibration and Metric Reconstruction in spite of Varying and Unknown Internal Camera Parameters. International Journal of Computer Vision, 32(1), 1999. pp. 1-18.

Jin, Hailin, Paolo Favaro, and Stefano Soatto. "Real-time feature tracking and outlier rejection with changes in illumination." Computer Vision, 2001. ICCV 2001. Proceedings. Eighth IEEE International Conference on. vol. 1. IEEE, 2001. pp. 1-12.

Tsai, R. Y. and Huang, T.S. Estimating three-dimensional motion parameters of a rigid planar patch, II: singular value decomposition. IEEE Transactions on Acoustics, Speech and Signal Processing, vol. ASSP-30, pp. 525-534, Aug. 1982.

Weng, J., Ahuja, N., and Huang, T.S. Motion and Structure from Point Correspondences with Error Estimation: Planar Surfaces. IEEE Transactions on Signal Processing, 39(12), 1991, pp. 1-27.

Longuet-Higgins, H.C. The visual ambiguity of a moving plane. Proceedings of the Royal Society of London, 1984, pp. 1-12.

Waxman, A. M. and Wohn, K. Contour evolution, neighborhood deformation and global image flow: Planar surfaces in motion. International Journal of Robotics Research, 4(3), 1985, pp. 1-15.

Richard Szeliski and P. H. S. Torr. Geometrically Constrained Structure from Motion: Points on Planes. European Workshop on 3D Structure from Multiple Images of Large-Scale Environments (SMILE), 1998, pp. 1-23.

Bartoli, A. and Sturm, P. Constrained Structure and Motion From Multiple Uncalibrated Views of a Piecewise Planar Scene. International Journal on Computer Vision, 52(1), 2003, pp. 1-42.

Philip H. S. Torr, Andrew W. Fitzgibbon, and Andrew Zisserman. The problem of degeneracy in structure and motion recovery from uncalibrated image sequences. International Journal of Computer Vision, 32(1), 1999, pp. 1-20.

Marc Pollefeys, Frank Verbiest, and Luc Van Gool. Surviving dominant planes in uncalibrated structure and motion recovery. In Proceedings of European Conference on Computer Vision, 2002, pp. 1-14.

O. Chum, T. Werner, and J. Matas. Two-view geometry estimation unaffected by a dominant plane. In Proceedings of IEEE Conference on Computer Vision and Pattern Recognition, 2005, pp. 1-8.

Robert Kaucic, Nicolas Dano, and Richard Hartley. Plane-based projective reconstruction. In Proceedings of International Conference on Computer Vision, 2001, pp. 1-8.

Carsten Rother. Linear multi-view reconstruction of points, lines, planes and cameras using a reference plane. In Proceedings of International Conference on Computer Vision, 2003, pp. 1-8.

C. Baillard and A. Zisserman. Automatic reconstruction of piecewise planar models from multiple views. In Proceedings of IEEE Conference on Computer Vision and Pattern Recognition, 1999, pp. 1-7.

Friedrich Fraundorfer, Konrad Schindler, and Horst Bischof. Piecewise planar scene reconstruction from sparse correspondences. Image and Vision Computing, 24(4), 2006, pp. 395-406.

Kanazawa, Y. and Kawakami, H. Detection of planar regions with uncalibrated stereo using distributions of feature points. In British Machine Vision Conference (BMVC), Kingston upon Thames, London, Sep. 2004, vol. 1, pp. 247-256.

Piazzi, J. and Prattichizzo, D. Plane Detection with stereo images. In International Conference Robotics and Automation, 2006, pp. 1-6.

Vincent, E. and Laganiere, R. Detecting planar homographies in an image pair. In International Symposium on Image and Signal Processing and Analysis, 2001, pp. 1-6.

Lopez-Nicolas, G., Guerrero, J.J., Pellejero, O.A., and Sagues, C. Computing homographies from three lines or points in an image pair. In ICIAP'05 Proceedings of the 13th international conference on Image Analysis and Processing, pp. 446-453 (2005).

David F. Fouhey, Daniel Scharstein, and Amy J. Briggs. Mulitple plane detection in image pairs using j-linkage. In Proc. 20th International Conference on Pattern Recognition (ICPR 2010), Istanbul, Turkey, Aug. 2010, pp. 1-4.

Manolis I.A. Lourakis, Antonis A. Argyros and Stelios C. Orphanoudakis. Detecting planes in an uncalibrated image pair. In Proc. BMVC'02, vol. 2, 2002, pp. 587-596 (2002).

Johann Prankl, Michael Zillich, Bastian Leibe, and Markus Vincze. Incremental model selection for detection and tracking of planar surfaces. In Proceedings of British Machine Vision Conference, 2010, p. 1.

Benoit Bocquillon, Pierre Gurdjos, and Alain Crouzil. Towards a guaranteed solution to plane-based selfcalibration. In ACCV, pp. 11-20, 2006.

(56) References Cited

OTHER PUBLICATIONS

M. Pollefeys, L.J.V. Gool, M. Vergauwen, F. Verbiest, K. Cornelis, J. Tops and R. Koch, "Visual Modeling with a Hand-Held Camera", International Journal of Computer Visioin, vol. 59(3), pp. 207-232, 2004.
P. Gurdjos and P. Sturm. Methods and geometry for plane-based self-calibration. In CVPR, 2003, p. 1-6.
Y. Ma, J. Kosecka, S. Soatto, and S. Sastry. An Invitation to 3-D Vision, From Images to Models. Springer-Verlag, New York, 2004, pp. 1-338.
Ezio Malis and Roberto Cipolla. Camera self-calibration from unknown planar structures enforcing the multiview constraints between collineations. PAMI, 24(9):1268-1272, 2002.
J. F. Menudet, J. M. Becker, T. Fournel, and C. Mennessier. Plane-based camera self-calibration by metric rectification of images. Image and Vision Computing, 26:913-934, Jul. 2008.
Peter F. Sturm and Stephen J. Maybank. On plane-based camera calibration: A general algorithm, singularities, applications. In CVPR, pp. 432-437, 1999.
Bill Triggs. Autocalibration from planar scenes. In Proceedings of European Conference on Computer Vision (ECCV), 1998, pp. 1-20.
C. Engels, H. Stewenius, and D. Nister, "Bundle adjustment rules," In Photogrammetric Computer Vision (PCV'06), 2006, pp. 1-6.
Bill Triggs, Philip F. McLauchlan, Richard I. Hartley and Andrew W. Fitzgibbon, "Bundle Adjustment—A Modern Synthesis," Proceedings of the International Workshop on Vision Algorithms: Theory and Practice, 1999, pp. 1-71.
Lourakis, M., Argyros, A., "The design and implementation of a generic sparse bundle adjustment software package based on the Levenberg-Marquardt algorithm," Technical Report 340, Institute of Computer Science—FORTH (2004), pp. 1-23.
Zhang, J., Boutin, M., and Aliaga, D., "Robust bundle adjustment for structure from motion," Proceedings of the International Conference on Image Processing (ICIP), 2006, pp. 1-4.
N. Snavely, S. Seitz, and R. Szeliski, "Modeling the world from internet photo collections," International Journal of Computer Vision, vol. 80, No. 2, pp. 189-210, 2008.
U.S. Appl. No. 13/300,277, filed Nov. 11, 2011, Hailin Jin, et al.
U.S. Appl. No. 13/551,603, filed Jul. 17, 2012, Hailin Jin, et al.
U.S. Appl. No. 13/551,601, filed Jul. 17, 2012, Hailin Jin, et al.
"Notice of Allowance", U.S. Appl. No. 13/724,871, Sep. 18, 2014, 6 pages.
"Notice of Allowance", U.S. Appl. No. 13/725,019, Jun. 23, 2014, 7 pages.
"Non-Final Office Action", U.S. Appl. No. 13/724,906, Oct. 16, 2014, 8 pages.
"Notice of Allowance", U.S. Appl. No. 13/724,973, Oct. 9, 2014, 7 pages.
"Supplemental Notice of Allowance", U.S. Appl. No. 13/724,871, Oct. 14, 2014, 2 pages.

\* cited by examiner

ALGORITHM SELECTION FOR STRUCTURE FROM MOTION

PRIORITY INFORMATION

This application claims benefit of priority of U.S. Provisional Application Ser. No. 61/621,365 entitled "Structure from Motion Methods and Apparatus" filed Apr. 6, 2012, the content of which is incorporated by reference herein in its entirety.

BACKGROUND

Description of the Related Art

In computer vision, inferring rigid-body motions of a camera from a video or set of images is a problem known as Structure from Motion (SFM). In SFM, a task or goal is to estimate the camera motion from a set of point correspondences in a set of images or video frames. Obtaining Structure from Motion (SFM) algorithms is of importance because a successful SFM algorithm would enable a wide range of applications in different domains including 3D image-based modeling and rendering, video stabilization, panorama stitching, video augmentation, vision based robot navigation, human-computer interaction, etc.

SUMMARY

Various embodiments of Structure from Motion (SFM) techniques and algorithms are described that may be applied, for example, to find the three-dimensional (3D) structures of a scene, for example from a video taken by a moving video camera or from a set of images taken with a still camera, as well as systems that implement these algorithms and techniques. In SFM, a task or goal is to estimate the camera motion (which may, but does not necessarily, have both translation and rotation components) from a set of point correspondences in a set of images or video frames. In addition, in at least some cases, intrinsic camera parameters (e.g., focal length) may also be estimated if not known. Performing the task of estimating camera motion and intrinsic parameters for a frame or a sequence of frames may be referred to as reconstruction. Thus, a reconstruction algorithm or technique (which may also be referred to as an SFM technique) may be implemented and applied to estimate the camera motion and intrinsic parameters for image sequences.

Embodiments of a selection technique are described for selecting a particular reconstruction technique to be applied to an image sequence. In at least some embodiments, this selection technique analyzes an input image sequence and, based on one or more characteristics of the image sequence, selects a reconstruction technique as the appropriate reconstruction technique for the particular image sequence from among a set of reconstruction techniques. For example, the set may include two or more of a rotation-based reconstruction technique, a plane-based reconstruction technique, and a general 3D reconstruction technique. Embodiments of the selection technique may be adapted to select from sets including other reconstruction techniques than those described herein, and may also be adapted to select from sets of other techniques that may be applied to image sequences than reconstruction (SFM) techniques.

Embodiments of a general SFM technique are described that are generally directed to performing reconstruction for image sequences in which the camera motion includes a non-zero translation component. The general SFM technique estimates the rotation and translation components of the camera motion, and may also estimate the camera intrinsic parameters (e.g., focal length) if not known. In addition, the general SFM technique may be directed to performing reconstruction for image sequences in which the scene does not contain a dominant plane.

Embodiments of a rotation-based SFM technique are described that are directed to performing reconstruction for image sequences in which the translation component of the camera motion is zero or near zero. The rotation-based SFM technique may only estimate the rotation component of the camera motion in an image sequence, and may also estimate the camera intrinsic parameters (e.g., focal length) if not known.

Embodiments of a plane-based reconstruction technique, also referred to as a plane-based SFM technique, are described that may be applied, for example, to find the three-dimensional (3D) structures of a scene, for example from a video taken by a moving video camera or from a set of images taken with a still camera. The plane-based SFM technique is generally directed to performing reconstruction for image sequences in which the scene includes a dominant plane.

Embodiments of the selection technique and of the rotation-based reconstruction technique, plane-based reconstruction technique, and general 3D reconstruction technique may be combined to produce an SFM system that takes as input an image sequence (or a set of point trajectories), selects an appropriate reconstruction technique (e.g., a rotation-based reconstruction technique, a plane-based reconstruction technique, or a general 3D reconstruction technique), and applies the selected reconstruction technique to generate an estimate of camera motion and camera intrinsic parameters (e.g. focal length) for the particular image sequence.

Figure 1:
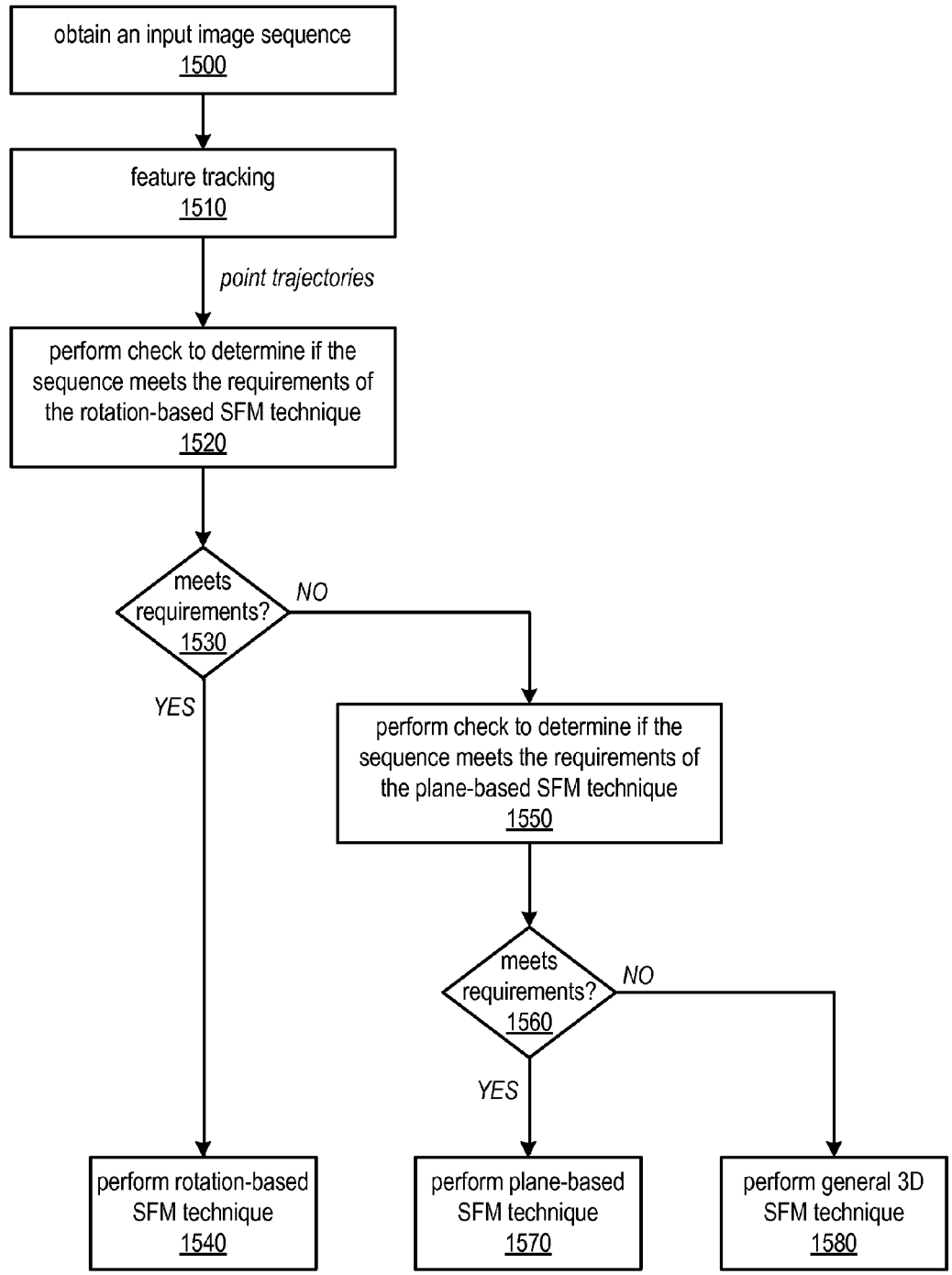
FIG. 1 is a flowchart of a method for selecting a particular reconstruction (SFM) technique to be applied to an image sequence, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of Structure from Motion (SFM) techniques and algorithms are described that may be applied, for example, to find the three-dimensional (3D) structures of a scene, for example from a video taken by a moving video camera or from a set of images taken with a still camera. Systems that may implement these algorithms and techniques are also described. In SFM, a task or goal is to estimate the camera motion (which may, but does not necessarily, have both translation and rotation components) from a set of point correspondences in a set of images or video frames. In addition, in at least some cases, intrinsic camera parameters (e.g., focal length) may also be estimated if not known. Performing the task of estimating camera motion and intrinsic parameters for a frame or a sequence of frames may be referred to as reconstruction. Thus, a reconstruction algorithm or technique (which may also be referred to as an SFM technique) may be implemented and applied to estimate the camera motion and intrinsic parameters for image sequences. Note that a distinct camera may be assumed for each image or frame in an image sequence. Thus, each frame or image in a sequence may be referred to as a "camera."

Embodiments of a selection technique are described for selecting a particular reconstruction technique to be applied to an image sequence. In at least some embodiments, this selection technique analyzes an input image sequence and, based on one or more characteristics of the image sequence, selects a reconstruction technique as the appropriate reconstruction technique for the particular image sequence from among a set of reconstruction techniques. For example, the set may include two or more of a rotation-based reconstruction technique, a plane-based reconstruction technique, and a general 3D reconstruction technique as described herein. Embodiments of the selection technique may be adapted to select from sets including other reconstruction techniques than those described herein, and may also be adapted to select from sets of other techniques that may be applied to image sequences than reconstruction (SFM) techniques.

Embodiments of a general 3D reconstruction technique, which may also be referred to as a general SFM technique, are described that are generally directed to performing reconstruction for image sequences in which the camera motion includes a non-zero translation component. The general SFM technique estimates the rotation and translation components of the camera motion, and may also estimate the camera intrinsic parameters (e.g., focal length) if not known. In addition, the general SFM technique may be directed to performing reconstruction for image sequences in which the scene does not contain a dominant plane.

In addition, embodiments of a rotation-based reconstruction technique, which may also be referred to as a rotation-based SFM technique, are described that are directed to performing reconstruction for image sequences in which the translation component of the camera motion is zero or near zero. The rotation-based SFM technique may only estimate the rotation component of the camera motion in an image sequence, and may also estimate the camera intrinsic parameters (e.g., focal length) if not known.

In addition, a plane-based reconstruction technique, which may also be referred to as a plane-based SFM technique, is described that is directed to performing reconstruction for image sequences in which the scene includes a dominant plane. The plane-based SFM technique estimates the rotation and translation components of the camera motion, and may also estimate the camera intrinsic parameters (e.g., focal length) if not known.

Embodiments of the selection technique and of the rotation-based reconstruction technique, plane-based reconstruction technique, and general 3D reconstruction technique may be combined to produce an SFM system that takes as input an image sequence (or a set of point trajectories), selects an appropriate reconstruction technique (e.g., a rotation-based reconstruction technique, a plane-based reconstruction technique, or a general 3D reconstruction technique), and applies the selected reconstruction technique to generate an estimate of camera motion and camera intrinsic parameters (e.g. focal length) for the particular image sequence.

Selecting a Particular SFM Technique for an Image Sequence

Embodiments of a selection technique are described for selecting a particular reconstruction (or SFM) technique to be applied to an image sequence. In at least some embodiments, this selection technique analyzes an input image sequence and, based on one or more characteristics of the image sequence, selects a reconstruction technique as the appropriate reconstruction technique for the particular image sequence from among a set of reconstruction techniques. For example, the set may include two or more of a rotation-based reconstruction technique, a plane-based reconstruction technique, and a general 3D reconstruction technique as described herein. Embodiments of the selection technique may be adapted to select from sets including other reconstruction techniques than those described herein, and may also be adapted to select from sets of other techniques that may be applied to image sequences than reconstruction (SFM) techniques.

Embodiments of the selection technique and of the rotation-based reconstruction technique, plane-based reconstruction technique, and general 3D reconstruction technique may be combined to produce an SFM system that takes as input an image sequence (or a set of point trajectories), selects an appropriate reconstruction technique (e.g., a rotation-based reconstruction technique, a plane-based reconstruction technique, or a general 3D reconstruction technique), and applies the selected reconstruction technique to generate an estimate of camera motion and camera intrinsic parameters (e.g. focal length) for the particular image sequence.

Embodiments of an SFM system are described that address the problem of estimating camera motion for a video sequence, a problem known in Computer Vision as Structure from Motion (SFM). Input to the SFM system may include at least an input image sequence. Output may include the intrinsic camera parameters (e.g., focal length) and the Euclidean (or metric) motion parameters for the images in the sequence. In order to obtain a Euclidean reconstruction, the intrinsic parameters of the camera(s) used to capture the sequence need to be known or, if not known, estimated. At least some embodiments of the SFM system may be configured to handle both cases where the intrinsic camera parameters (e.g., focal length) are known (e.g., via user input or via metadata provided with the input image sequence) and cases where the intrinsic camera parameters are not known. The first case may be referred to herein as the calibrated case, and the second case may be referred to herein as the uncalibrated case.

In at least some embodiments of the SFM system, in the case where the intrinsic parameters are not known (the uncalibrated case), one or more of the following assumptions may be made:
the principal point of each image is known, as is the pixel aspect ratio. Note that both principal points may be allowed to change over time;
there is no pixel skew. The only potential unknown intrinsic parameter is the focal length; and
information on whether or not the focal length changes in the sequence is available.

From the above, in at least some embodiments of the SFM system, three different cases may be supported:
calibrated; all the intrinsic parameters are known;
uncalibrated, with a constant focal length; and
uncalibrated, with a varying focal length.

A set of reconstruction algorithms or techniques that can be used to perform SFM are assumed. In at least some embodiments, three reconstruction techniques are assumed: a rotation-based reconstruction technique, a plane-based reconstruction technique, and finally a general 3D reconstruction technique. Each technique has its own requirements. In order for a particular reconstruction algorithm to run on a given sequence of images or frames (e.g., a video sequence), embodiments of the SFM system may determine if the requirements of the particular technique are met for the given image sequence.

To understand the requirements of the three reconstruction techniques, refer to the sections below that describe embodiments of a rotation-based reconstruction technique, a plane-based reconstruction technique, and a general 3D reconstruction technique (each may also be referred to as an SFM technique). The rotation-based SFM technique assumes the camera does not move over the entire sequence (i.e. that the camera motion of the sequence has a zero or near zero translation component). As a result, it only estimates the rotation component of the camera motion. The plane-based SFM technique assumes that the camera moves in the sequence (i.e. that the camera motion of the sequence has non-zero translation component), and also assumes that there is a dominant plane in the scene. The general 3D SFM technique assumes that the camera moves in the sequence and that the scene does not contain a dominant plane.

The requirements for each of the three reconstruction techniques are not only different, but may also be incompatible with the other algorithms. For instance, if a sequence has only camera rotation, the rotation-based reconstruction technique should be used because the other two reconstruction techniques both assume camera movement (i.e., a non-zero translation component). If a sequence has camera movement and has a dominant plane, then the rotation-based reconstruction technique and the general 3D reconstruction technique should not be used because both assume that there is no dominant plane, and in addition the rotation-based reconstruction technique assumes no camera movement. If the wrong reconstruction technique is used on an image sequence, the reconstruction technique may not be able to correctly compute the camera motion.

Figure 7:
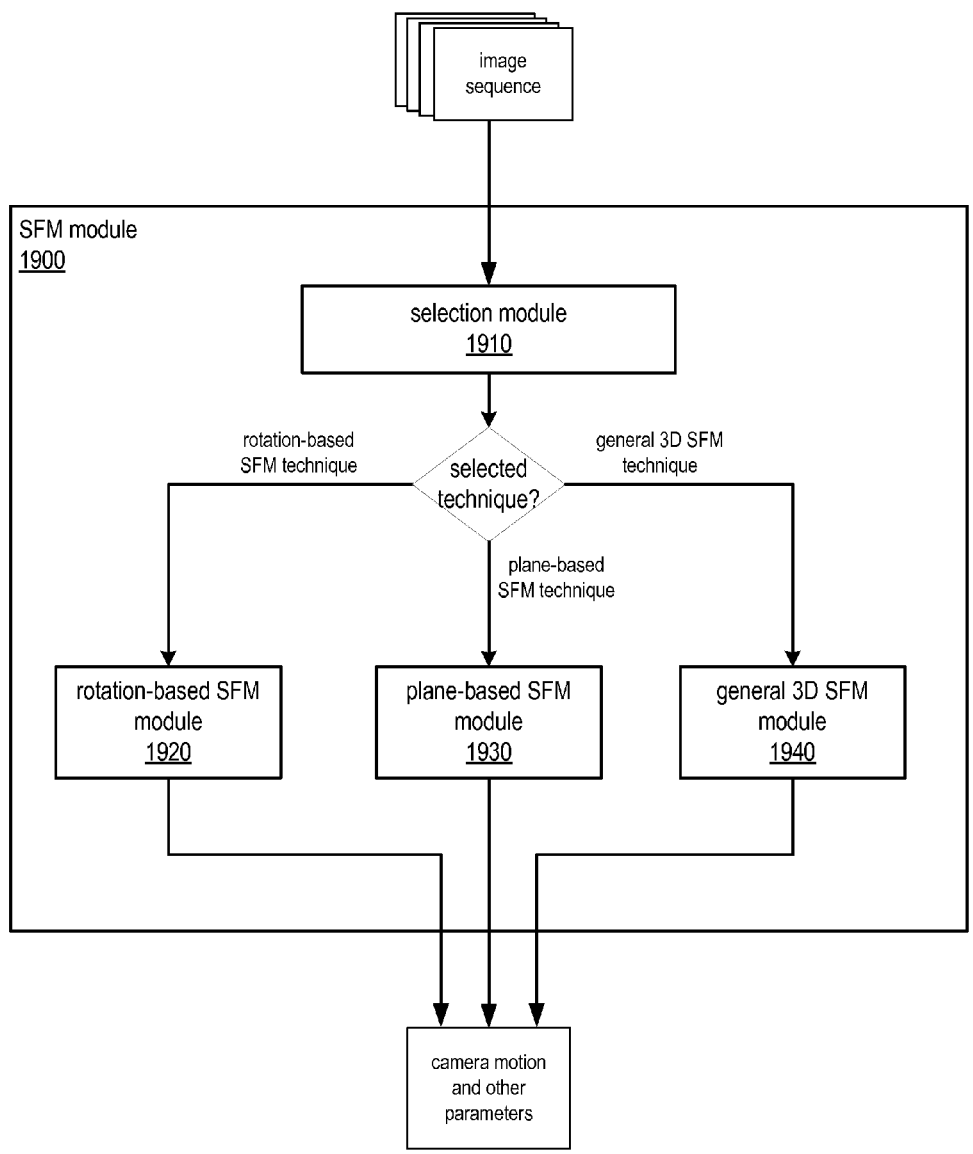
FIG. 7 illustrates a module that may implement and select from multiple SFM techniques, according to at least some embodiments.

Thus, given as input an image sequence, the SFM system is directed to determining which reconstruction technique is the most appropriate to apply to the sequence. FIG. 1 is a flowchart of a method for selecting a particular reconstruction (SFM) technique to be applied to an image sequence, according to at least some embodiments. Note that the method may be implemented in an SFM system. FIG. 7 shows an example SFM module that may implement the method as shown in FIG. 1.

As indicated at 1500 of FIG. 1, an input image sequence may be obtained. The image sequence may, for example, be a video taken by a moving video camera or a set of images taken with a still camera. As indicated at 1510, a feature tracking technique may be applied to establish point trajectories over time in the input image sequence. A feature tracking technique that may be used in at least some embodiments is described below. However, any feature tracking technique may be used. Output of the feature tracking technique is a set of point trajectories, each point trajectory tracking a feature across two or more of the frames.

As indicated at 1520, a check may be performed to determine if the image sequence meets the requirements of the rotation-based SFM technique. At 1530, if the image sequence meets the requirements of the rotation-based SFM technique, then the rotation-based SFM technique may be performed, as indicated at 1540. Otherwise, a check may be performed to determine if the image sequence meets the requirements of the plane-based SFM technique, as indicated at 1550. At 1560, if the image sequence meets the requirements of the plane-based SFM technique, then the plane-based SFM technique may be performed, as indicated at 1570. Otherwise, the general 3D SFM technique may be performed, as indicated at 1580.

The following sections discuss elements 1510, 1520, 1530, 1550, and 1560 of FIG. 1 in more detail. Note that embodiments of SFM techniques that may be used at elements 1540, 1570, and 1580 are each discussed in more detail elsewhere in this document. Embodiments of a rotation-based SFM technique that may be used at element 1540 are discussed in the section titled Rotation-based reconstruction technique. Embodiments of a plane-based SFM technique that may be used at element 1570 is discussed in the section titled Plane-based SFM technique. Embodiments of a general SFM technique that may be used at element 1580 are discussed in the section titled General 3D reconstruction technique.

Feature Tracking

As indicated at 1510 of FIG. 1, a feature tracking technique may be applied to establish point trajectories over time in the input image sequence. A basic idea of feature tracking is to find the locations of the same point in subsequent video frames. In general, a point should be tracked as long and as accurately as possible, and as many points as possible should be tracked.

In at least some embodiments, the SFM system may use an implementation of the Lucas-Kanade-Tomasi algorithm to perform feature tracking. In these embodiments, for every point at time t, a translational model may be used to track against the previous video frame (at time t−1), and an affine model may be used to track against the reference video frame at time $t_0$ ($t_0$ may vary according to the point). The result of feature tracking is a set of point trajectories. Each trajectory includes the two-dimensional (2D) locations of the "same" point in a contiguous set of frames. Let $x_{i,j}$ denote the 2D location of the i-th point in the j-th image. Since not all of the points are present in all of the images, $x_{i,j}$ is undefined for some combinations of i and j. To simplify the notation, a binary characteristic function, $\psi_{i,j}$: $\psi_{i,j}=1$, may be used if the i-th point is present on the j-th image; otherwise, $\psi_{i,j}=0$. Through $\psi_{i,j}$, quantities such as $\psi_{i,j} x_{i,j}$ may be used even if $x_{i,j}$ is undefined.

Note that various feature tracking algorithms and/or various matching paradigms, such as detecting and matching robust image features, may be used in some embodiments. The SFM system can work with any feature tracking technique that computes point trajectories.

In at least some embodiments, the point trajectories are input to the rest of the SFM system; the input image sequence may not be referenced after feature tracking Two-View Reconstruction Before going into details on how to select the best algorithm for a given image sequence, a method for fitting a rigid motion for a pair of frames is discussed. This rigid motion fitting may provide a baseline in terms of number of corresponding points. Note that both the rotation-based reconstruction model and the plane-based reconstruction model are stronger models and may not be able to discover points that are consistent with a static scene. Also note that this component may be used in the selection algorithm. Let $r_0$ and $r_1$ be the indices of the two images. The method may first find all the point trajectories that overlap both images. The reconstruction algorithm is different according to the camera intrinsic parameters.

Two-View Reconstruction, Calibrated Case

In the calibrated case, a Euclidian reconstruction technique can be performed, since the camera intrinsic parameters are known. In at least some embodiments, a 5-point based RANSAC algorithm may be used to compute the initial relative rigid motion between the two images. The RANSAC algorithm returns the essential matrix from $r_0$ to $r_1$ along with a set of points that are consistent with the essential matrix. From the essential matrix, the overlapping points can be triangulated. Points whose reprojection errors are larger than a threshold may be discarded. The essential matrix may be decomposed into the relative rotation and translation. There are four solutions for the decomposition step. The solution that has the largest number of consistent points may be chosen.

In at least some embodiments, the reconstruction may be further refined with a nonlinear optimization. In at least some embodiments, the nonlinear optimization refines the following cost function:

$$\arg\min_{X_i,R,T} \sum_{i=1}^{N} \psi_{i,r_0} \tag{E1}$$

$$\psi_{i,r_1}(\|x_{i,r_0} - \pi(K_{r_0} X_i)\|^2 + \psi_{i,j} \|x_{i,r_1} - \pi(K_{r_1}(RX_i + T))\|^2)$$

In at least some embodiments, the nonlinear optimization problem may be solved according to a nonlinear optimization technique. The nonlinear optimization obtains a better estimate for the relative rotation R, translation T, and three-dimensional (3D) points $X_i$. However, this estimate only uses inlier points estimated the previous RANSAC step. In at least some embodiments, the estimates may be improved by re-computing the inlier points and again performing the nonlinear optimization. At least some embodiments may iterate between the nonlinear optimization and computing inlier points until a convergence test is met, or until some other terminating condition is met.

Two-View Reconstruction, Uncalibrated Case

In the uncalibrated case, the camera intrinsic parameters are not known. Although it may be possible to obtain a Euclidean reconstruction using the assumptions presented above, in at least some embodiments, a projective reconstruction from the two images may be performed.

In at least some embodiments, a 7-point based RANSAC algorithm may be used to compute the fundamental matrix between frames $r_0$ and $r_1$. The algorithm gives the best fundamental matrix along with a set of inlier points that are consistent with the fundamental matrix. The inlier points may be used to compute a new fundamental matrix using a linear algorithm. The fundamental matrix may then be converted into a pair of 3×4 projection matrices using a canonical decomposition technique. Using the two projection matrices, the inlier points can be triangulated, for example using an optimal triangulation algorithm.

In at least some embodiments, the two projection matrices and 3D points may be refined using a nonlinear optimization. In at least some embodiments, the nonlinear optimization refines the following cost function:

$$\arg\min_{X_i,P} \sum_{i=1}^{N} \psi_{i,r_0} \tag{E2}$$

$$\psi_{i,r_1}(\|x_{i,r_0} - \pi(K_{r_0} X_i)\|^2 + \psi_{i,j} \|x_{i,r_1} - \pi(K_{r_1}(P^L X_i + P^R))\|^2)$$

where $P^L$ and $P^R$ are the left 3×3 and right 3×1 parts of P respectively. In at least some embodiments, the nonlinear optimization problem may be solved according to a nonlinear optimization technique, for example as described in the section titled Bundle adjustment technique. The nonlinear optimization may obtain a better estimate for the projection matrices and the 3D points. Similar to the calibrated case, the nonlinear optimization only uses inlier points estimated in the previous RANSAC/linear step. In at least some embodiments, the estimates may be improved by re-computing the inlier points and again performing the nonlinear optimization. At least some embodiments may iterate between the nonlinear optimization and computing inlier points until a convergence test is met, or until some other terminating condition is met.

Selecting the Best SFM Technique

In at least some embodiments, the SFM system first checks to see if the image sequence satisfies the requirements of the rotation-based SFM technique, since both the plane-based and general 3D SFM techniques expect the sequence to have camera movement, while the rotation-based SFM technique does not. If the sequence satisfies the requirements of the rotation-based SFM technique (e.g., has a zero or near-zero translational component), that technique is used. Otherwise, the SFM system checks to see if the sequence satisfies the requirements of the plane-based SFM technique. In at least some embodiments, this check may be performed by determining if the scene contains a dominant plane. If the sequence satisfies the requirements of the plane-based SFM technique (e.g., has a dominant plane), the plane-based SFM technique is used. Otherwise, the general 3D SFM technique is used.

Keyframe Selection

In at least some embodiments, the method for selecting the best SFM technique may start by selecting a set of candidate frames. This set of candidate frames may be referred to as keyframes. In at least some embodiments, a keyframe selection algorithm may select a set of evenly spaced keyframes, for example one keyframe every half second or one keyframe every 15 frames, starting from the first frame of the image sequence. In at least some embodiments, video frame rate information, if available, may be used in determining which frames to select. For example, if the video frame rate is 30 frames per second, and the algorithm wants to sample at one frame every half-second, then the algorithm may select every $15^{th}$ frame as a keyframe. In at least some embodiments, if frame rate information is not available, the keyframe selection algorithm may assume the video is taken at 30 frames per second, or at some other rate. In at least some embodiments, if the last frame in the video sequence is not in the keyframe set, the frame is added as a keyframe. In at least some embodiments, output of the keyframe selection algorithm may be a set of evenly spaced keyframes, e.g. every $15^{th}$ frame from the image sequence, which includes the first and last frames in the image sequence. Note, however, that the next-to-last and last keyframe may be closer than other pairs of keyframes in the set, since the last keyframe may have been added in the last step.

Note that the keyframe selection algorithm described above is given as an example and is not intended to be limiting. Other techniques may be used to select a set of keyframes in some embodiments.

Searching for Rotation

As indicated at 1520 of FIG. 1, a check may be performed to determine if the image sequence meets the requirements of the rotation-based SFM technique. In at least some embodiments, this may be performed by checking all the adjacent-1 keyframe pairs, adjacent-2 keyframe pairs, and adjacent-4 keyframe pairs. An adjacent-k keyframe pair may be defined as a keyframe pair in which the keyframes are k frames apart from each other. At least some embodiments may optionally check additional keyframe pairs such as adjacent-8 and/or adjacent-16 keyframe pairs. A method for performing this check on a given pair of keyframes is discussed below. If the sequence satisfies the requirements for all the keyframe pairs that are checked, the rotation-based SFM technique is selected and applied.

Given a pair of keyframes with indices $r_0$ and $r_1$, the method for performing a check on a given pair of keyframes first finds the points that are available in both images. In at least some embodiments, a two-view reconstruction is performed from the points using an appropriate algorithm as described in the section titled Two-view reconstruction. If the two-view reconstruction fails, the method ends. If the two-view reconstruction succeeds, the method continues with a rotation reconstruction as follows.

In at least some embodiments, a RANSAC-based algorithm may be used to compute the relative rotation between the two images. The exact algorithm used may be different depending on information available regarding the camera intrinsic parameters. We have three possible cases:

Calibrated; all the intrinsic parameters are known. In this case, a 2-point based RANSAC algorithm that only estimates a relative rotation may be used in at least some embodiments.

Uncalibrated with a constant focal length. In this case, a 2-point based RANSAC algorithm that estimates a focal length and a rotation may be used in at least some embodiments.

Uncalibrated with a varying focal length. In this case, a 3-point based RANSAC algorithm that estimates a focal length and a rotation may be used in at least some embodiments.

If the RANSAC rotation estimation algorithm fails, the search is stopped. Otherwise, the RANSAC algorithm returns the following estimates in all three cases: the relative rotation between the two images, the focal lengths for each image, and a set of points that are consistent with the model (focal lengths and rotation). In at least some embodiments, a nonlinear optimization may be performed to refine the estimates with one of the following cost functions (depending on the camera intrinsic parameters):

$$\operatorname*{argmin}_{x_i, R} \sum_{i=1}^{N} \|x_{i,r_0} - \pi(K_{r_0} x_i)\|^2 + \|x_{i,r_1} - \pi(K_{r_1} R x_i)\|^2 \quad (E3)$$

$$\arg\min_{x_i, f, R} \sum_{i=1}^{N} \|x_{i,r_0} - \pi(K_{r_0} x_i)\|^2 + \|x_{i,r_1} - \pi(K_{r_1} R x_i)\|^2 \quad (E4)$$

$$\arg\min_{x_i, f_1, f_2, R} \sum_{i=1}^{N} \|x_{i,r_0} - \pi(K_{r_0} x_i)\|^2 + \|x_{i,r_1} - \pi(K_{r_1} R x_i)\|^2 \quad (E5)$$

In at least some embodiments, the nonlinear optimization only uses the inlier points. The result of the nonlinear optimization is a set of refined parameters.

In at least some embodiments, the check works as follows. All the points that are consistent with the two-view reconstruction are fit against the estimated relative rotation (after nonlinear optimization). In at least some embodiments, the fitting is done according to a nonlinear optimization technique. For each point, the fitting residual is computed on both images, and the average is used. All of the residuals are sorted, and an 80% value is computed. The product of the number of two-view reconstructable correspondences and the 80% value are compared against a threshold. If the product is above the threshold, the pair of keyframes is not a rotation pair; otherwise, it is a rotation pair.

Searching for a Plane

In at least some embodiments, if the image sequence did not qualify under the rotation-based SFM technique as described above, a check may be performed to determine if the image sequence meets the requirements of the plane-based SFM technique, as indicated at 1550 of FIG. 1. In at least some embodiments, this may be performed by checking all the adjacent-1 keyframe pairs and adjacent-2 keyframe pairs. A method for performing this check on a given pair of keyframes is discussed below. If the sequence satisfies the requirements for all the adjacent-1 and adjacent-2 keyframe pairs that are checked, the plane-based SFM technique is selected and applied. Otherwise, the general 3D SFM technique may be applied.

In at least some embodiments, given a pair of keyframes with indices $r_0$ and $r_1$, the method for performing a check on a given pair of keyframes first finds the points that are available in both images. In at least some embodiments, a two-view reconstruction is performed from the points using an appropriate algorithm as described in the section titled Two-view reconstruction. If the two-view reconstruction fails, the method ends. If the two-view reconstruction succeeds, the method continues with a plane-based reconstruction as follows.

In at least some embodiments, a RANSAC-based algorithm may be used to compute the relative homography between the two images. If the RANSAC estimation algorithm fails, the search is stopped. Otherwise, the RANSAC algorithm returns the following estimates: the relative homography between the two images and a set of points that are consistent with the homography. In at least some embodiments, a nonlinear optimization may be performed to refine the estimates with the following cost function:

$$\operatorname*{argmin}_{x_i, H} \sum_{i=1}^{N} (\|x_{i,r_0} - \pi(K_{r_0} x_i)\|^2 + \|x_{i,r_1} - \pi(K_{r_1} H x_i)\|^2) \quad \text{(E2)}$$

In at least some embodiments, the nonlinear optimization only uses the inlier points computed in the RANSAC stage. The result of the nonlinear optimization is a set of refined parameters.

In at least some embodiments, the check works as follows. All the points that are consistent with the two-view reconstruction are fit against the estimated relative rotation (after nonlinear optimization). In at least some embodiments, the fitting is done according to a nonlinear optimization technique. For each point, the fitting residual is computed on both images, and the average is used. All of the fitting residuals are sorted, and an 80% value is computed. The product of the number of two-view reconstructable correspondences and the 80% value are compared against a threshold. If it is above the threshold, we say the pair of keyframes is not a plane pair; otherwise, it is a plane pair.

Plane-Based SFM Technique

Embodiments of a plane-based reconstruction technique, also referred to as a plane-based SFM technique, are described that may be applied, for example, to find the three-dimensional (3D) structures of a scene, for example from a video taken by a moving video camera or from a set of images taken with a still camera. The plane-based SFM technique is generally directed to performing reconstruction for image sequences in which the scene includes a dominant plane.

In embodiments of the plane-based SFM technique, a plane detection and tracking algorithm may take point trajectories as input and provide as output a set of inter-image homographies. The inter-image homographies may, for example, be used to generate estimates for 3D camera motion, camera intrinsic parameters, and plane normals using a plane-based self-calibration technique as described below.

In at least some embodiments, the plane detection and tracking algorithm may obtain a set of point trajectories for a set of images (e.g., a video sequence, or a set of still photographs). A two-dimensional (2D) plane may be detected from the trajectories, and trajectories that follow the 2D plane through the images may be identified. The identified trajectories may then be used to compute a set of inter-image homographies for the images as output. In at least some embodiments, for cases where one plane does not appear in all images, plane identification and tracking may be performed on different planes in different subsets of the images, and merge the resulting homographies to output a single reconstruction.

Embodiments of the plane-based SFM technique may also employ a robust technique for self-calibration of a moving camera observing a planar scene (referred to as plane-based self-calibration technique). The plane-based self-calibration technique may take as input the homographies between images estimated from point correspondences and provide an estimate of the focal lengths for all the cameras. The plane-based self-calibration technique may be based on the enumeration of the inherently bounded space of the focal lengths. Each sample of the search space defines a plane in the 3D space and in turn produces a tentative Euclidean reconstruction for all the cameras, which are then scored. The sample with the best score may be chosen, and the final focal lengths and camera motions are computed. Variations on this technique may handle both constant focal length cases and varying focal length cases.

General 3D Reconstruction Technique

Embodiments of a robust system for estimating camera motion (rotation and translation) in image sequences, a problem known in computer vision as Structure from Motion (SFM), are described. Embodiments of a general 3D reconstruction technique, which may also be referred to as a general SFM technique, are generally directed to performing reconstruction for image sequences in which the camera motion includes a non-zero translation component. In other words, the camera has moved when capturing the image sequence. The general SFM technique estimates the rotation and translation components of the camera motion, and may also estimate the camera intrinsic parameters (e.g., focal length) if not known. In addition, the general SFM technique may be generally directed to performing reconstruction for image sequences in which the scene does not contain a dominant plane.

Figure 2:
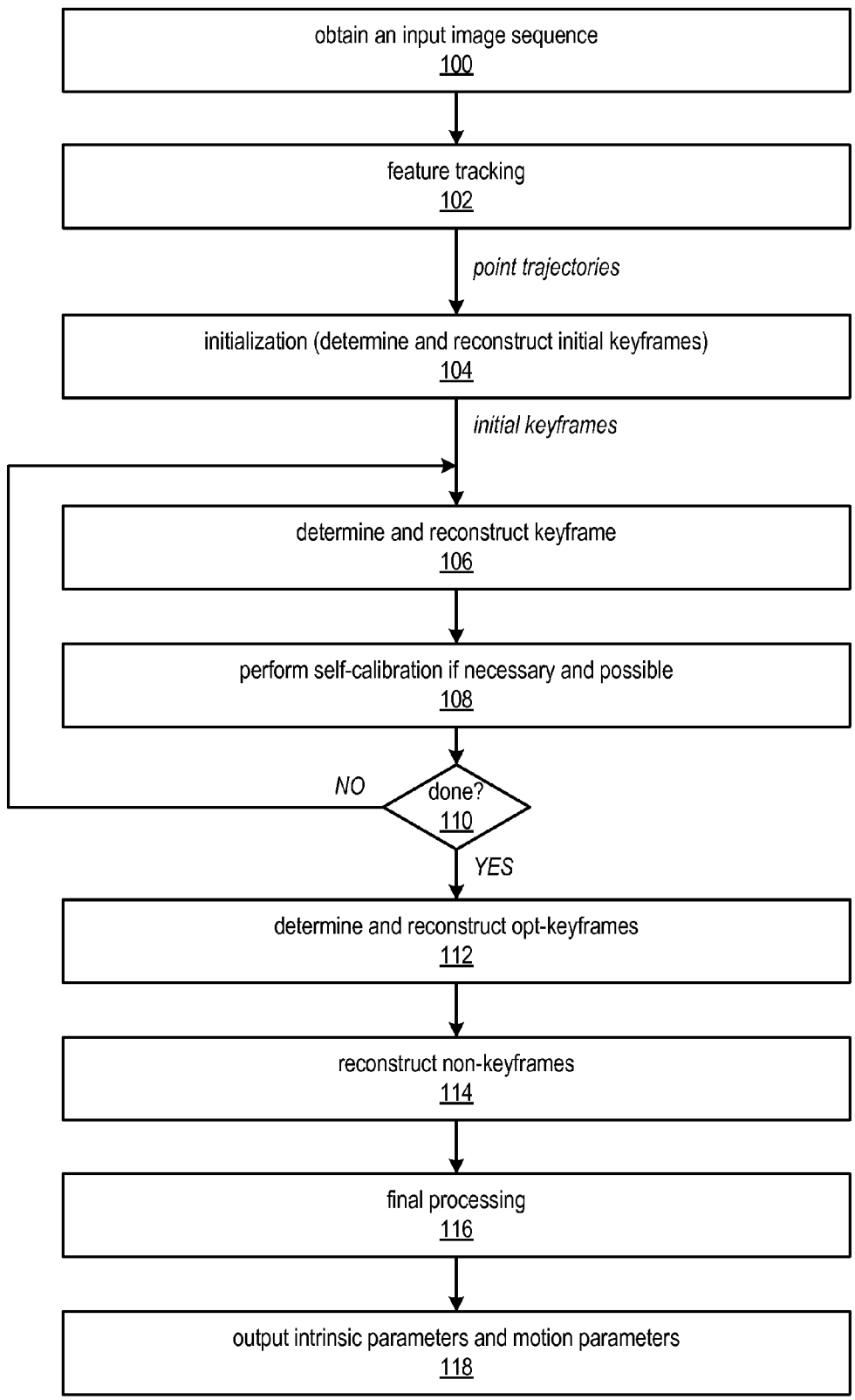
FIG. 2 is a high-level flowchart of a general 3D Structure from Motion (SFM) technique, according to at least some embodiments.

FIG. 2 is a high-level flowchart of the general SFM technique, according to at least some embodiments. As indicated at 100, an input image sequence may be obtained. The image sequence may, for example, be a video taken by a moving video camera or a set of images taken with a still camera. As indicated at 102, a feature tracking technique may be applied to establish point trajectories over time in the input image sequence. Embodiments of a feature tracking technique that may be used in at least some embodiments are described later in this document. Output of the feature tracking technique is a set of point trajectories. As indicated at 104, an initialization technique may be performed to determine and reconstruct a set of initial keyframes covering a portion of the image sequence according to the point trajectories. Input to the initialization technique includes at least the set of point trajectories. Output of the initialization technique is a set of initial keyframes and the initial reconstruction.

Elements 106 through 110 are a keyframe reconstruction loop that incrementally and adaptively determines and reconstructs additional keyframes to fully cover the image sequence. As indicated at 106, a new keyframe is determined and reconstructed. In the calibrated case, a Euclidian reconstruction technique can be performed, since the camera intrinsic parameters are known. In the uncalibrated case, a projective reconstruction technique may be performed. As indicated at 108, in the uncalibrated case, a self-calibration technique may be applied to produce a Euclidian (or metric) reconstruction for the frame, if there are enough frames to perform the self-calibration. At 110, if there are more keyframes to be reconstructed, then the method returns to 106 to add a next keyframe. Otherwise, the method goes to element 112. As indicated at 112, an opt-keyframe technique may then be performed to determine and reconstruct optimization keyframes to improve the quality of the reconstruction. As indicated at 114, non-keyframes (keyframes that have not yet been included in the reconstruction) may be reconstructed. As indicated at 116, final processing may be performed. As indicated at 118, at least the camera intrinsic parameters and the Euclidean motion parameters for the images in the input image sequence may be output.

Elements of the general SFM technique shown in FIG. 2 are discussed in more detail below.

Feature Tracking

As indicated at 102 of FIG. 2, given an input image sequence, embodiments of the general SFM technique may first perform feature tracking to establish point trajectories over time. A basic idea of feature tracking is to find the locations of the same point in subsequent video frames. In general, a point should be tracked as long and as accurately as possible, and as many points as possible should be tracked.

In at least some embodiments, the general SFM technique may use an implementation of the Lucas-Kanade-Tomasi algorithm to perform feature tracking. In these embodiments, for every point at time t, a translational model may be used to track against the previous video frame (at time t−1), and an affine model may be used to track against the reference video frame at time $t_0$ ($t_0$ may vary according to the point). The result of feature tracking is a set of point trajectories. Each point trajectory includes the two-dimensional (2D) locations of the "same" point in a contiguous set of frames. Let $x_{i,j}$ denote the 2D location of the i-th point in the j-th image. Since not all of the points are present in all of the images, $x_{i,j}$ is undefined for some combinations of i and j. To simplify the notation, a binary characteristic function, $\psi_{i,j}$: $\psi_{i,j}=1$, may be used if the i-th point is present on the j-th image; otherwise, $\psi_{i,j}=0$. Through $\psi_{i,j}$, quantities such as $\psi_{i,j}x_{i,j}$ may be used even if $x_{i,j}$ is undefined.

Note that various feature tracking algorithms and/or various matching paradigms, such as detecting and matching robust image features, may be used in various embodiments. The general SFM technique can work with any feature tracking technique that computes point trajectories.

In at least some embodiments, the point trajectories are input to the rest of the general SFM technique; the input image sequence may not be referenced after feature tracking.

Initialization Technique

As indicated at 104 of FIG. 2, an initialization technique may be performed to determine and reconstruct a set of initial keyframes covering a portion of the image sequence according to the point trajectories. As previously noted, at least some embodiments of the general SFM technique may implement an incremental approach that adds one or more frames to the reconstruction at a time. To accomplish this, an initial reconstruction may need to be generated. A goal of the initialization technique is to compute an initial reconstruction from a subset of frames in the image sequence. In at least some embodiments, two-view reconstruction algorithms may be used. Since the general SFM technique is incremental, the quality of the initial reconstruction may be important in generating a quality overall reconstruction. In at least some embodiments, to help achieve a quality initial reconstruction, two initial frames that best satisfy requirements of the initial reconstruction algorithm may be determined.

In at least some embodiments of an initialization technique, input to the initialization technique includes at least the set of point trajectories. Two initial keyframes may be selected. A reconstruction may be performed from the two initial keyframes. Additional keyframes between the initial keyframes may be determined and reconstructed. A global optimization of the reconstruction may be performed. One or more outlier points may be determined and removed. One or more inlier points may be determined and recovered. Note that outlier and inlier points correspond to particular point trajectories, and that the entire point trajectory is removed (for outlier points) or recovered (for inlier points). If more than a threshold number of inliers were recovered, another global optimization may be performed as indicated at 280. Otherwise, the initialization technique is done. Output of the initialization technique is a set of initial keyframes and the initial reconstruction.

Keyframe Reconstruction Loop

After initialization, additional keyframes may be determined and reconstructed to cover the image sequence. In at least some embodiments of the general SFM technique, a keyframe reconstruction loop may be used to enlarge the initial reconstruction to cover the entire image sequence, as shown in elements 106-110 of FIG. 2. The keyframe reconstruction loop may add keyframes in an incremental and adaptive fashion, adding one keyframe at a time until the entire video sequence is covered. Note that this loop does not add all the frames in the input image sequence. Instead, an adaptive algorithm is used to select particular frame to add. In at least some embodiments, the additional keyframes may be selected from the set of keyframes that were previously selected. In at least some embodiments, the initial reconstruction may cover a portion of the image sequence, and the additional keyframes may be added one at a time at each end of the current reconstruction, working outwards and alternating between ends.

Figure 3:
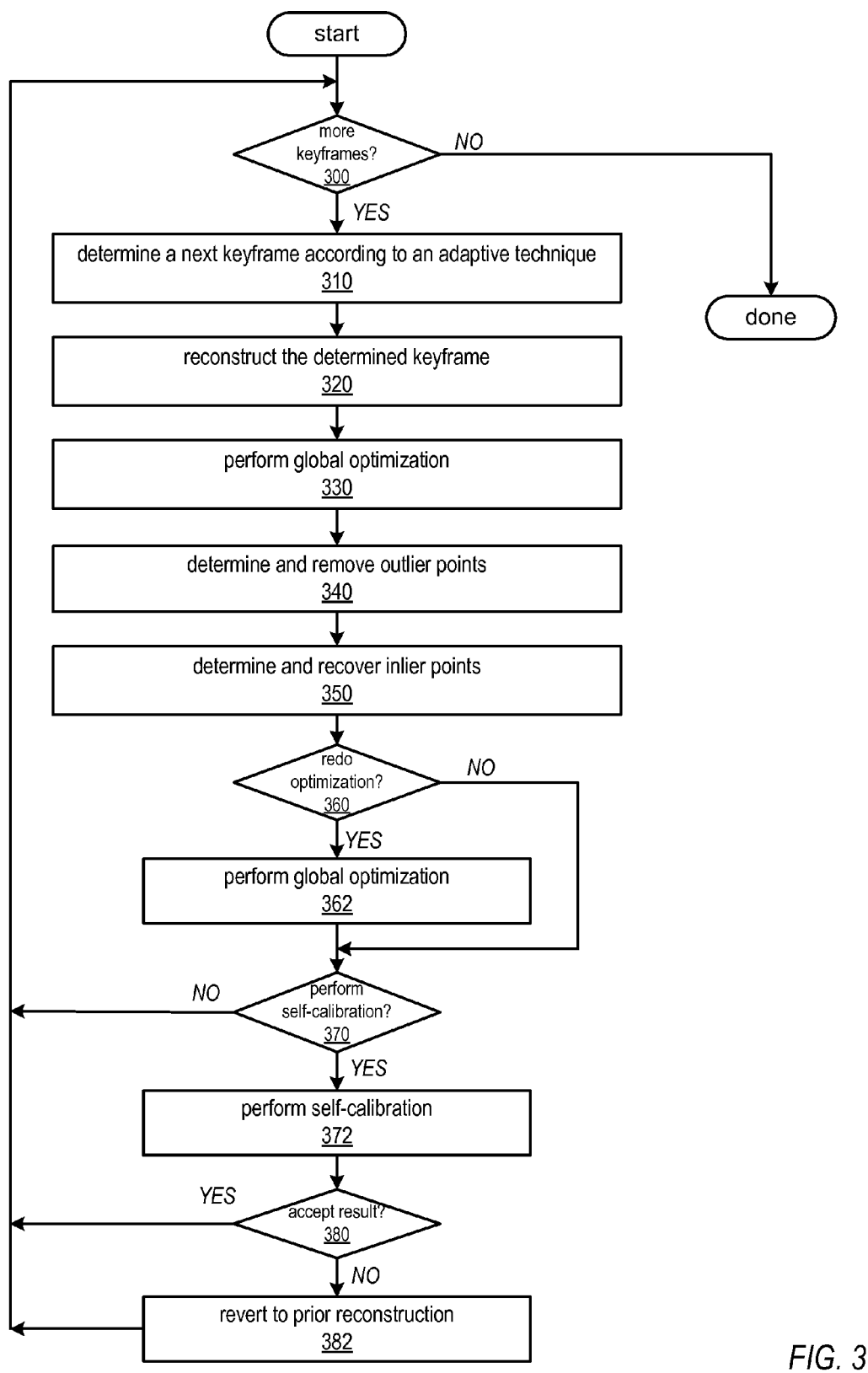
FIG. 3 is a flowchart of an adaptive technique for iteratively selecting and reconstructing additional keyframes to fully cover the image sequence that may be used in a general adaptive reconstruction algorithm, for example as implemented by a general 3D SFM technique, according to at least some embodiments.

FIG. 3 is a flowchart of an adaptive technique for iteratively selecting and reconstructing additional keyframes to fully cover the image sequence that may be used in a general adaptive reconstruction algorithm, for example as implemented by a general 3D SFM technique, according to at least some embodiments. At 300, if all keyframes have been processed, then the adaptive technique for iteratively selecting and reconstructing additional keyframes is done. Otherwise, the technique proceeds to element 310. As indicated at 310, a next keyframe may be determined according to an adaptive selection technique. As indicated at 320, the determined keyframe may be reconstructed and thus added to the current reconstruction. As indicated at 330, a global optimization may be performed on the current reconstruction. As indicated at 340, one or more outlier points may be determined and removed from the reconstruction. As indicated at 350, one or more inlier points may be determined and recovered (added to the reconstruction). At 360, if the number of inlier points that were added exceed a threshold, then a global optimization may again be performed on the current reconstruction as indicated at 362. At 370, in the calibrated case, the current reconstruction is already a Euclidian reconstruction, so the technique returns to element 300 to determine if there are more keyframes to be processed. Otherwise, this is the uncalibrated case, and the reconstruction is a projective construction. If there are enough frames to perform self-calibration at this point, then self-calibration may be performed as indicated at 372 to upgrade the projective reconstruction to a Euclidean reconstruction. Results of the self-calibration may be analyzed to determine if the results are acceptable. At 380, if the results of the self-calibration are accepted, the technique returns to element 300 to determine if there are more keyframes to be processed. Otherwise, the technique reverts to the reconstruction prior to the self-calibration attempt as indicated at 382, and the technique returns to element 300 to determine if there are more keyframes to be processed.

Self-Calibration

In at least some embodiments, a self-calibration technique may be applied to upgrade a reconstruction from projective to Euclidean (metric). Note that self-calibration may not be applied to the calibrated case because the reconstruction is already metric. Once the reconstruction is Euclidean, self-calibration does not need to be performed. In at least some embodiments, self-calibration is only performed when the number of cameras in the current reconstruction reaches a certain threshold. The section titled Nonlinear Self-Calibration Technique describes a self-calibration technique that may be used in at least some embodiments. This section describes a few extra steps that may be taken in some embodiments to ensure that the results of the self-calibration technique are good and thus accepted.

Figure 4:
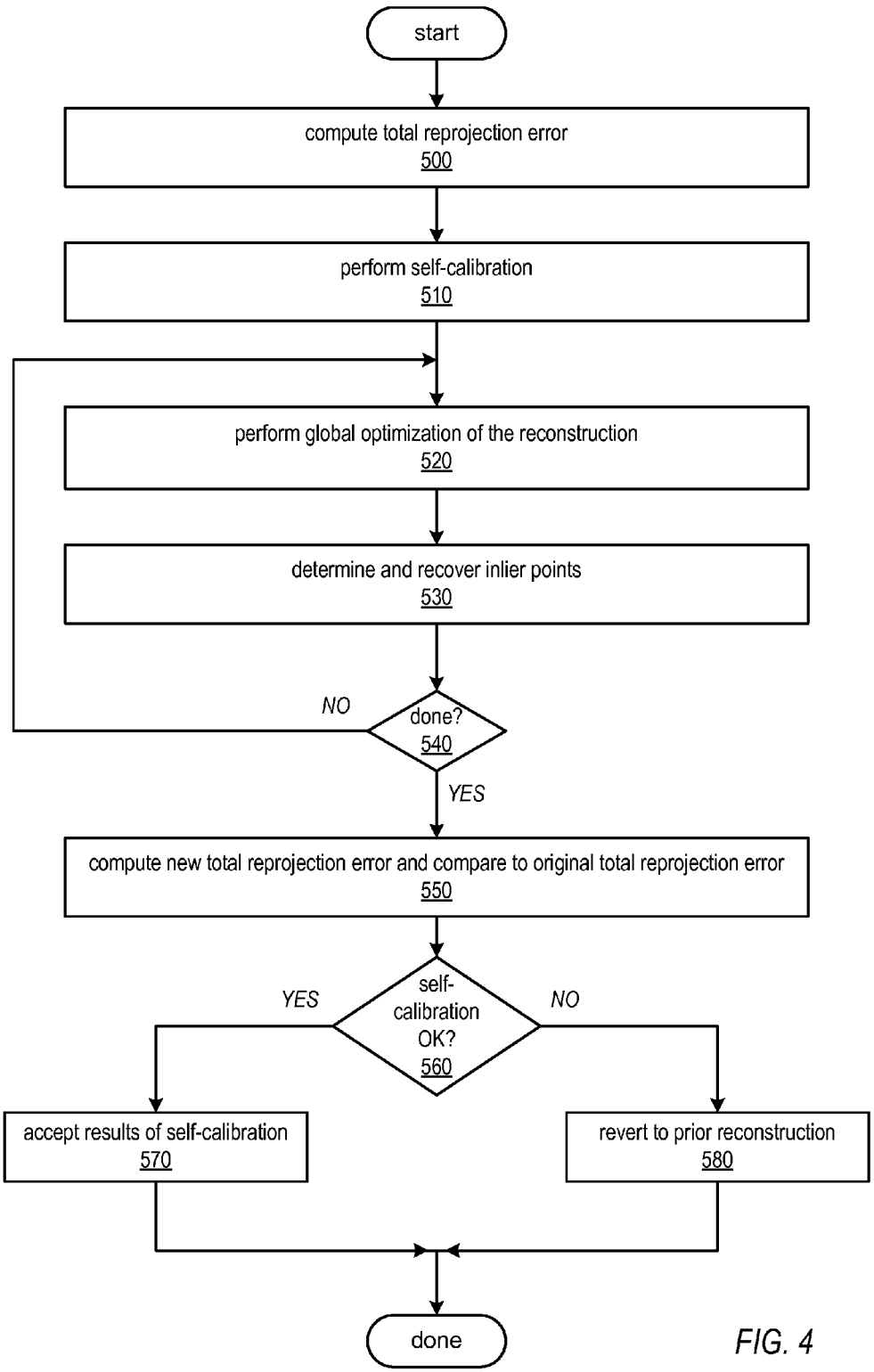
FIG. 4 is a flowchart of a self-calibration technique that may be applied in the adaptive technique for iteratively selecting and reconstructing additional keyframes, according to at least some embodiments.

FIG. 4 is a flowchart of a self-calibration technique that may be implemented in the adaptive technique for iteratively selecting and reconstructing additional keyframes, according to at least some embodiments. In at least some embodiments, before self-calibration, a total reprojection error is computed, as indicated at 500. Self-calibration is then performed, as indicated at 510. In at least some embodiments, a nonlinear self-calibration technique may be used. After self-calibration, a global optimization of the reconstruction may be performed, as indicated at 520. In at least some embodiments, a multi-view bundle adjustment technique may be used. As indicated at 530, inlier points may be determined and recovered. As indicated by 540, in at least some embodiments, the method may iterate between adding inliers and global optimization (e.g., multi-view bundle adjustment) until either no new inlier is added or the iteration count reaches a pre-defined threshold. At 540, when done, a new total reprojection error may be computed and compared to the total reprojection error that was previously computed at 500, as indicated at 550. At 560, the results of the comparison may be used to determine if the self-calibration was successful. In at least some embodiments, if the new total reprojection error is no more than a pre-defined factor of the total reprojection error computed before self-calibration, the self-calibration result is accepted as indicated at 570. Otherwise, the self-calibration step has failed, and the reconstruction is reverted back to the state before self-calibration, as indicated at 580.

Opt-Keyframe Reconstruction

As indicated at 112 of FIG. 2, an opt-keyframe technique may be applied to a reconstruction for an image sequence to determine and reconstruct optimization keyframes to improve the quality of the reconstruction. In the opt-keyframe technique, additional frames, referred to herein as "opt-keyframes", are determined and added to the reconstruction, and the reconstruction is again globally optimized. By adding more optimized frames and more optimized points, the quality of the reconstruction may be improved.

In at least some embodiments of an opt-keyframe reconstruction technique, opt-keyframes may be determined and added to the reconstruction so that the total number of frames in the reconstruction satisfies a threshold. One or more bad (outlier) points may be determined according to one or more criteria and removed from the reconstruction. One or more good (inlier) points may be determined and recovered. Bad (outlier) points may again be determined according to one or more criteria and removed from the reconstruction. The reconstruction may then be globally optimized.

In at least some embodiments, given the current reconstruction, a set of opt-keyframes may be computed that are uniformly spread in the entire sequence so that the total number of frames reaches a pre-defined threshold. The camera parameters for the newly selected opt-keyframes may be computed.

Non-Keyframe Reconstruction

As indicated at 114 of FIG. 2, non-keyframes (keyframes that have not yet been included in the reconstruction) may be reconstructed. In at least some embodiments of a non-keyframe reconstruction technique, all of the frames in the input sequence that are not included in the current reconstruction may be reconstructed. These frames may be referred to as non-keyframes. In at least some embodiments, all the frames in the reconstruction that include both keyframes and opt-keyframes are first reconstructed. In at least some embodiments, the non-keyframe reconstruction technique may work on adjacent pairs of keyframes until all the pairs of keyframes have been processed. In at least some embodiments, for each pair, all of the 3D points that are visible in both frames are collected. These points may then be used to compute the parameters for a camera between the two frames.

Final Processing

As indicated at 116 of FIG. 2, final processing may be performed. In at least some embodiments, there may be two steps in the final processing. In at least some embodiments, the largest contiguous subset of frames in the reconstruction may be found. All the frames that are not in this subset, along with all the points that are not visible in any of the frames in the subset, may be removed from the reconstruction. In at least some embodiments, optionally, all of the frames and points in the reconstruction may be optimized (global optimization). In at least some embodiments, this optimization may be performed according to a refinement process that optimizes all the points and cameras together.

Output and Example Applications of the General SFM Technique

As indicated at 118 of FIG. 2, at least the camera intrinsic parameters and the Euclidean motion parameters for the images in the input image sequence may be output. Note that the reconstruction may have been cropped to the largest contiguous set of frames, as described in the section titled Final Processing. The output (at least the camera intrinsic parameters and the Euclidean motion parameters for the images in the input image sequence) of the general SFM technique described above may be used in a wide range of applications in different domains including but not limited to 3D image-based modeling and rendering, video stabilization, panorama stitching, video augmentation, vision based robot navigation, human-computer interaction, etc. For example, the camera intrinsic parameters and the Euclidean motion parameters determined from the video sequence using an embodiment of the general SFM technique as described herein may be used to insert a 3D object into a video sequence. The inserted 3D object moves with the motion of the camera to maintain a natural and believable positioning in the frames.

Rotation-Based Reconstruction Technique

Embodiments of a robust system for estimating camera rotation in image sequences (e.g., video sequences) are described. Embodiments of a rotation-based reconstruction technique, which may also be referred to as a rotation-based SFM technique, are described that are generally directed to performing reconstruction for image sequences with a zero or near-zero translation component. The rotation-based SFM technique may estimate only the rotation component of the camera motion in an image sequence, and may also estimate the camera intrinsic parameters (e.g., focal length) if not known. Input to the rotation-based SFM technique may include an image sequence, and output may include the camera intrinsic parameters (e.g., focal length) and the rotation parameters for all the images in the sequence. By only estimating a rotation component of camera motion, the assumption is made that the camera is not moving throughout the entire sequence. However, the camera is allowed to rotate and zoom arbitrarily. Embodiments of the rotation-based SFM technique may support both the case where the camera intrinsic parameters are known (e.g., via user input or metadata) and the case where the camera intrinsic parameters are not known. The first case may be referred to herein as the calibrated case, and the second case may be referred to herein as the uncalibrated case.

At least some embodiments of the rotation-based SFM technique may implement an incremental approach to generating a reconstruction from an input image sequence. In particular, at least some embodiments of the rotation-based SFM technique may start from an initial subset of frames and add one or more frames at a time until the entire image sequence is processed. As an alternative to the incremental approach that processes all the frames in an image sequence, embodiments of the rotation-based SFM technique may be applied to sub-sequences of frames in a divide-and-conquer approach. A divide-and-conquer approach divides the image sequence into sub-sequences, solves the sub-sequences, and recursively merges the sub-sequences to obtain a final result.

In at least some embodiments, high-level components of the rotation-based SFM technique may include a feature tracking component, an initialization component that adaptively determines and reconstructs an initial set of keyframes that covers only a part of an image sequence (e.g., a set of spaced frames somewhere in the middle of the sequence), a keyframe reconstruction component that incrementally and adaptively determines and reconstructs additional keyframes to fully cover the image sequence, a non-keyframe reconstruction component that reconstructs any remaining frames in the image sequence, and a final processing component.

Figure 5:
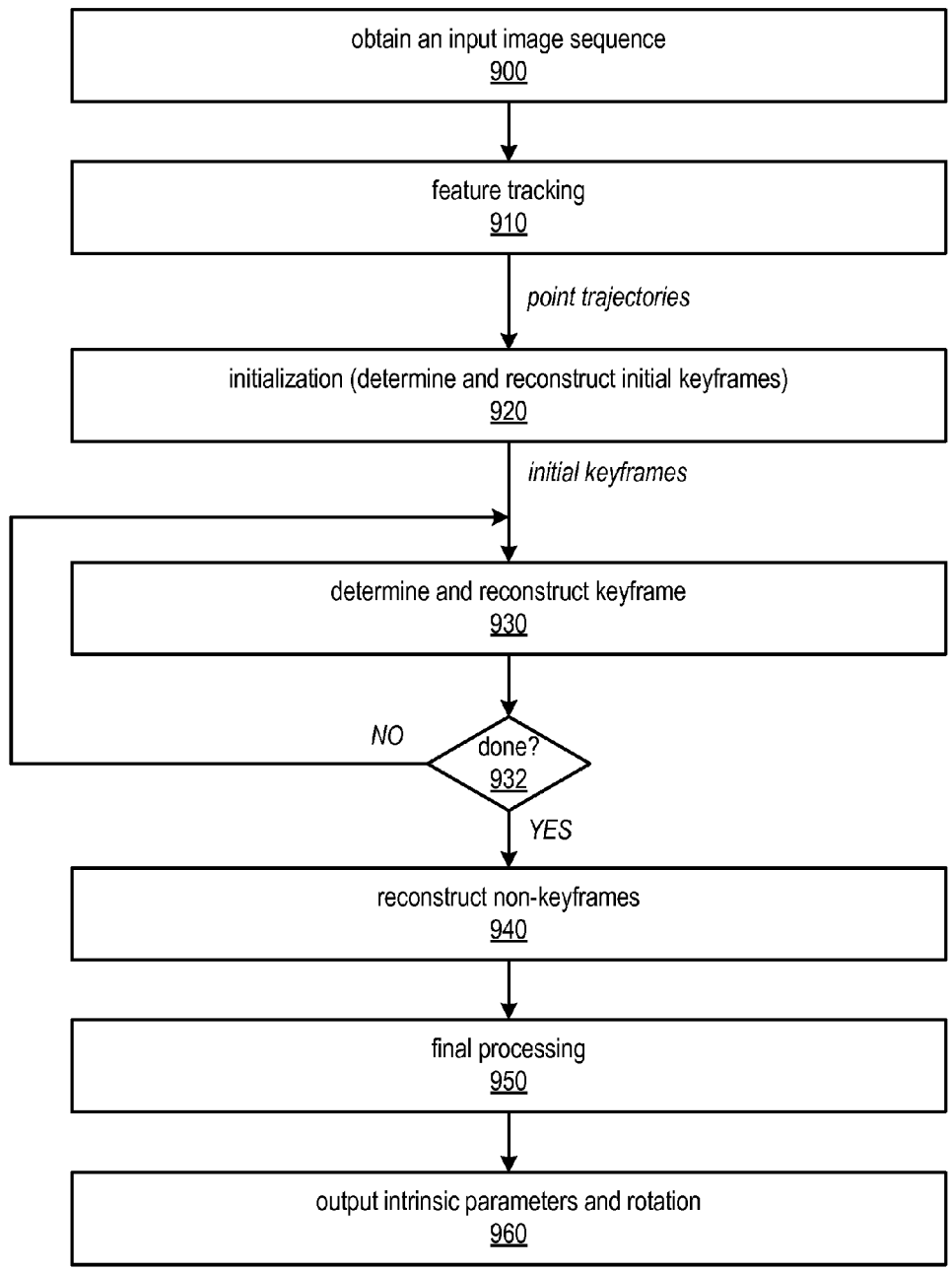
FIG. 5 is a high-level flowchart of a rotation-based Structure from Motion (SFM) technique, according to at least some embodiments.

FIG. 5 is a high-level flowchart of the rotation-based SFM technique, according to at least some embodiments. As indicated at 900, an input image sequence may be obtained. The image sequence may, for example, be a video taken by a video camera or a set of images taken with a still camera. As indicated at 910, a feature tracking technique may be applied to establish point trajectories over time in the input image sequence. Embodiments of a feature tracking technique that may be used in at least some embodiments are described in this document. Output of the feature tracking technique is a set of point trajectories. As indicated at 920, an initialization technique may be performed to determine and reconstruct a set of initial keyframes covering a portion of the image sequence according to the point trajectories. Input to the initialization technique includes at least the set of point trajectories. Output of the initialization technique is a set of initial keyframes and the initial reconstruction.

Elements 930 and 932 are a keyframe reconstruction loop that incrementally and adaptively determines and reconstructs additional keyframes to fully cover the image sequence. As indicated at 930, a new keyframe is determined and reconstructed. At 932, if there are more keyframes to be reconstructed, then the method returns to 930 to add a next keyframe. Otherwise, the method goes to element 940. As indicated at 940, non-keyframes (keyframes that have not yet been included in the reconstruction) may be reconstructed. As indicated at 950, final processing may be performed. As indicated at 960, at least the camera intrinsic parameters and the rotation component for the images in the input image sequence may be output.

Elements of the rotation-based SFM technique shown in FIG. 5 are discussed in more detail below.

Feature Tracking

As indicated at 910 of FIG. 5, given an input image sequence, embodiments of the rotation-based SFM technique may first perform feature tracking to establish point trajectories over time. A basic idea of feature tracking is to find the locations of the same point in subsequent video frames. In general, a point should be tracked as long and as accurately as possible, and as many points as possible should be tracked.

In at least some embodiments, the rotation-based SFM technique may use an implementation of the Lucas-Kanade-Tomasi algorithm to perform feature tracking. In these embodiments, for every point at time t, a translational model may be used to track against the previous video frame (at time t−1), and an affine model may be used to track against the reference video frame at time $t_0$ ($t_0$ may vary according to the point). The result of feature tracking is a set of point trajectories. Each trajectory includes the 2D locations of the "same" point in a contiguous set of frames. Let $x_{i,j}$ denote the 2D location of the i-th point in the j-th image. Since not all of the points are present in all of the images. $x_{i,j}$ is undefined for some combinations of i and j. To simplify the notation, a binary characteristic function, $\psi_{i,j}$: $\psi_{i,j}=1$, may be used if the i-th point is present on the j-th image; otherwise, $\psi_{i,j}=0$. Through $\psi_{i,j}$, quantities such as $\psi_{i,j} x_{i,j}$ may be used even if $x_{i,j}$ is undefined.

Note that various feature tracking algorithms and/or various matching paradigms, such as detecting and matching robust image features, may be used in some embodiments. The rotation-based SFM technique can work with any feature tracking technique that computes point trajectories.

In at least some embodiments, the point trajectories are input to the rest of the rotation-based SFM technique; the input image sequence may not be referenced after feature tracking Initialization Technique As indicated at 920 of FIG. 5, an initialization technique may be performed to determine and reconstruct a set of initial keyframes covering a portion of the image sequence according to the point trajectories. As previously noted, at least some embodiments of the rotation-based SFM technique may implement an incremental approach that adds one or more frames to the reconstruction at a time. To accomplish this, an initial reconstruction may need to be generated. A goal of the initialization technique is to compute an initial reconstruction from a subset of frames in the image sequence. The quality of the initialization is very important. To obtain this quality, two initial frames that have a sufficient number of well-distributed points and that have sufficiently large relative rotation may need to be determined.

In at least some embodiments of an initialization technique, input to the initialization technique includes at least the set of point trajectories. Two initial keyframes may be selected. A reconstruction may be performed from the two initial keyframes. Additional keyframes between the initial keyframes may be determined and reconstructed. A global optimization of the reconstruction may be performed. One or more outlier points may be determined and removed. One or more inlier points may be determined and recovered. Note that outlier and inlier points correspond to particular point trajectories, and that the entire point trajectory is removed (for outlier points) or recovered (for inlier points). If more than a threshold number of inliers were recovered, another global optimization may be performed as indicated at 280. Otherwise, the initialization technique is done. Output of the initialization technique is a set of initial keyframes and the initial reconstruction.

Keyframe Reconstruction Loop

As indicated at 930 and 932 of FIG. 5, additional keyframes may be determined and reconstructed to cover the image sequence. In at least some embodiments of the rotation-based SFM technique, a keyframe reconstruction loop may be used to enlarge the initial reconstruction to cover the entire image sequence. The keyframe reconstruction loop may add keyframes in an incremental and adaptive fashion, adding one keyframe at a time until the entire video sequence is covered. Note that this loop does not add all the frames in the input image sequence. Instead, an adaptive algorithm is used to select particular frame to add. In at least some embodiments, the additional keyframes may be selected from the set of keyframes that were previously selected. In at least some embodiments, the initial reconstruction may cover a portion of the image sequence, and the additional keyframes may be added one at a time at each end of the current reconstruction, working outwards and alternating between ends.

In at least some embodiments, a next keyframe may be selected in either of two directions: before and after the current reconstructed set of keyframes. At least some embodiments may alternate between the two directions.

Keyframe Reconstruction

This section describes methods for computing a new keyframe, for example a frame as selected in the previous section, according to some embodiments. Let the index of the new keyframe be s. The reconstructed camera that is closest to s is found. Let the index of this camera be $s_0$. All the points in $s_0$ and s are found. In the case of calibrated cameras and uncalibrated cameras with a constant focal length, either the correct focal length or a good idea about the focal length (because it is constant and we have estimates from other frames) are available. In at least some embodiments, to make the algorithm more robust, the focal length may be fixed, and only the rotation parameter is estimated. In at least some embodiments, a 2-point based RANSAC algorithm may be used to compute an initial rotation.

In the case of uncalibrated cameras with a varying focal length, the focal length of $s_0$ is known, but not the focal length of s. In at least some embodiments, to estimate the focal length along with the camera rotation, a 2-point based RANSAC algorithm may be used. In at least some embodiments, the initial rotation may be refined with a nonlinear optimization technique. The nonlinear optimization may provide a better estimate for the rotation and focal length. A next step is to add new points. In at least some embodiments, all the points that overlap both frames $s_0$ and s but that are not in either the inlier set or the outlier set of the current reconstruction are found. For each point, the optimal 2D coordinates may be computed using the newly estimated rotation parameters for keyframe s and the rotation parameters for keyframe $s_0$ from the current reconstruction. The points whose residuals are below a certain threshold may be added to the inlier set.

In at least some embodiments, the newly reconstructed keyframe and the newly added points may be optimized together with the existing frames and points (global optimization). A goal is to obtain better estimates for all the parameters jointly. In at least some embodiments, a multi-view bundle adjustment is performed with all the cameras and all the points. After the bundle adjustment, points whose reprojection errors are too large may be removed; these points may be moved from the inlier set to the outlier set. All of the points in the outlier set may then be searched to find points that are consistent with the motion parameters; these points may be moved from the outlier set to the inlier set. If the number of newly added inliers exceeds a threshold, which may be computed as a ratio of the number of the original points, an additional multi-view bundle adjustment may be performed.

Non-Keyframe Reconstruction

As indicated at 940 of FIG. 5, non-keyframes (keyframes that have not yet been included in the reconstruction) may be reconstructed. In at least some embodiments of a non-keyframe reconstruction technique, all of the frames in the input sequence that are not computed in the current reconstruction may be reconstructed. These frames may be referred to as non-keyframes. In at least some embodiments, the non-keyframe reconstruction technique may work on adjacent pairs of keyframes until all the pairs of keyframes have been processed. In at least some embodiments, for each pair, all the 2D points that are visible in both frames are collected. These points may then be used to compute the rotation and focal length, if needed, for a camera between the two frames.

Final Processing

As indicated at 950 of FIG. 5, final processing may be performed. In at least some embodiments, there may be two steps in the final processing. In at least some embodiments, the largest contiguous subset of frames in the reconstruction may be found. All the frames that are not in this subset, along with all the points that are not visible in any of the frames in the subset, may be removed from the reconstruction. In at least some embodiments, optionally, all of the frames and points in the reconstruction may be optimized (global optimization). In at least some embodiments, this optimization may be performed according to a refinement process that optimizes all the points and cameras together.

Output and Example Applications of the Rotation-Based Reconstruction Technique

As indicated at 960 of FIG. 5, at least the camera intrinsic parameters and the rotation component of the camera motion for the images in the input image sequence may be output. Note that the reconstruction may have been cropped to the largest contiguous set of frames, as described in the section titled Final Processing. The output (at least the camera intrinsic parameters and the rotation component of the camera motion in an image sequence) of the rotation-based reconstruction technique may be used in a wide range of applications in different domains including but not limited to 3D image-based modeling and rendering, video stabilization, panorama stitching, video augmentation, vision based robot navigation, human-computer interaction, etc.

Example Implementations

Some embodiments may include a means for generating structure and motion for a set of images or frames according to the SFM techniques described herein. For example, an SFM module may receive input specifying a set of point trajectories and generate as output structure and motion for a set of images or frames as described herein. The SFM module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform one or more of the techniques as described herein. Other embodiments of the module(s) may be at least partially implemented by hardware circuitry and/or firmware stored, for example, in a non-volatile memory.

Figure 6:
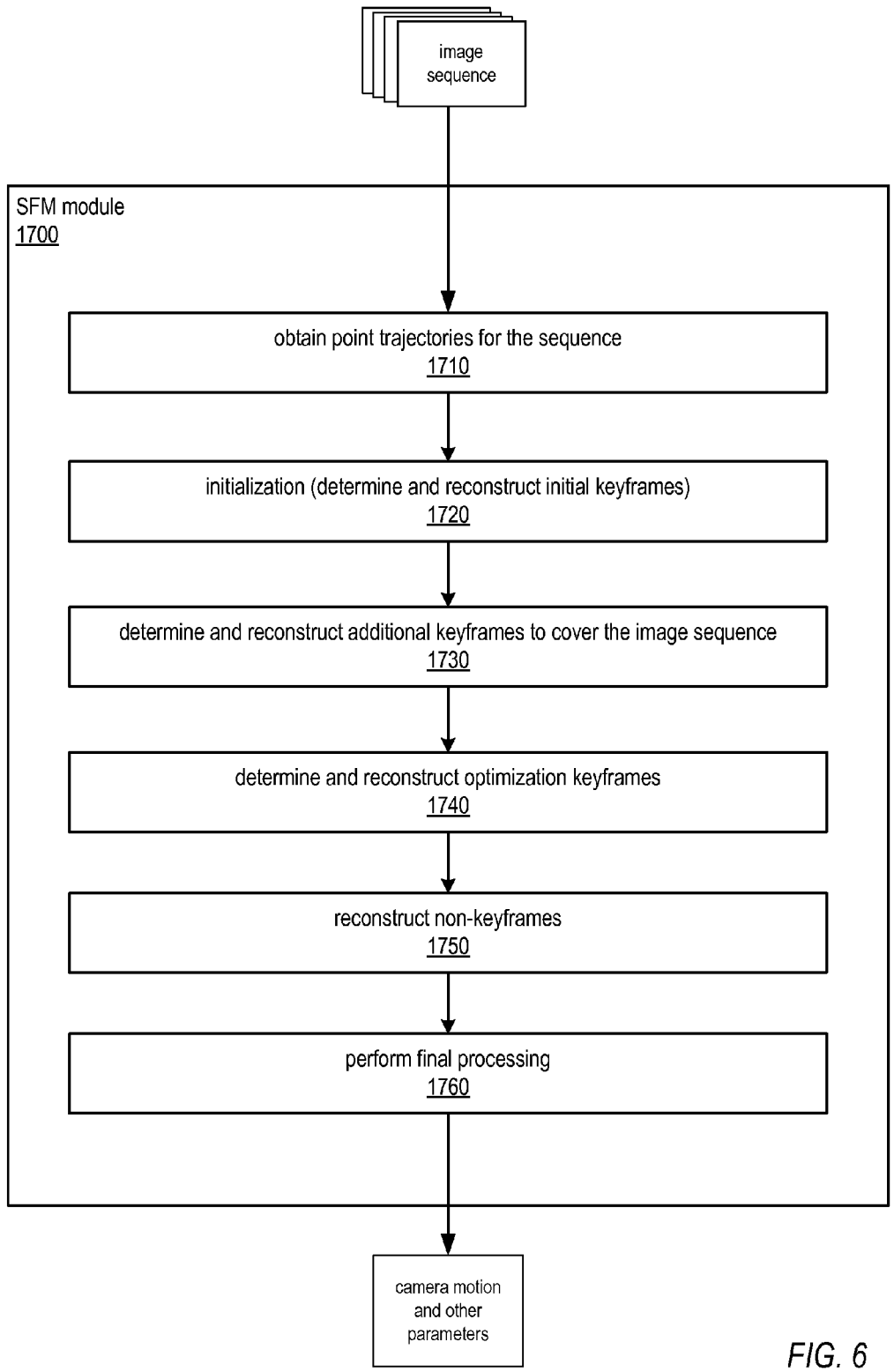
FIG. 6 illustrates a module that may implement one or more of the Structure from Motion (SFM) techniques and algorithms as described herein, according to at least some embodiments.
Figure 8:
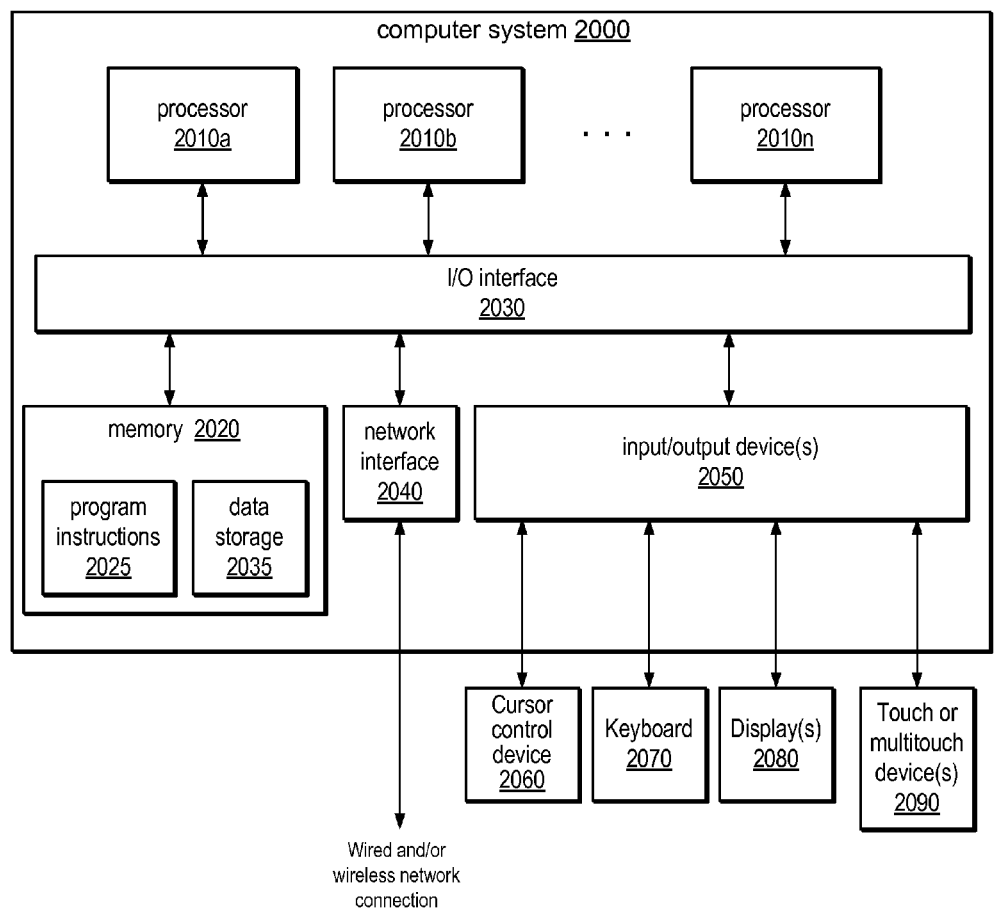
FIG. 8 illustrates an example computer system that may be used in embodiments.

Embodiments of the module may, for example, be implemented as a stand-alone application, as a module of an application, as a plug-in or plug-ins for applications including image or video processing applications, and/or as a library function or functions that may be called by other applications such as image processing or video processing applications. Embodiments of the module may be implemented in any image or video processing application, or more generally in any application in which video or image sequences may be processed. Example applications in which embodiments may be implemented may include, but are not limited to, Adobe® Premiere® and Adobe® After Effects®. "Adobe," "Adobe Premiere," and "Adobe After Effects" are either registered trademarks or trademarks of Adobe Systems Incorporated in the United States and/or other countries. An example module that may implement one or more of the SFM techniques as described herein is illustrated in FIG. 6. An example computer system on which the module may be implemented is illustrated in FIG. 8. Note that the module may, for example, be implemented in still cameras and/or video cameras.

FIG. 6 illustrates a module that may implement an SFM technique as illustrated in the accompanying Figures and described herein, according to at least some embodiments. Module 1700 may, for example, receive an input image sequence, or alternatively a set of point trajectories for the images in a sequence. Module 1700 then applies one or more of the techniques as described herein to generate structure, camera parameters, and motion. In at least some embodiments, module 1700 may obtain point trajectories for the sequence, as indicated at 1710. Module 1700 may then perform initialization to determine and reconstruct initial keyframes, as indicated at 1720. Module 1700 may then determine and reconstruct additional keyframes to cover the video sequence, as indicated at 1730. Module 1700 may then determine and reconstruct optimization keyframes, as indicated at 1740. Module 1700 may then reconstruct non-keyframes, as indicated at 1750. Module 1700 may then perform final processing, as indicated at 1760. In at least some embodiments, module 1700 may generate as output estimates of camera parameters and camera motion for the image sequence.

FIG. 7 illustrates a module that may implement a method for selecting from multiple SFM techniques as illustrated in the accompanying Figures and described herein, according to at least some embodiments. An example computer system on which the module may be implemented is illustrated in FIG. 8. SFM module 1900 may include a selection module 1910 that may implement a selection technique as described herein, a rotation-based SFM module 1920 that may implement a rotation-based reconstruction technique as described herein, a plane-based SFM module 1930 that may implement a plane-based reconstruction technique as described herein, and a general 3D SFM module 1940 that may implement a general 3D reconstruction technique as described herein. SFM module 1900 may, for example, receive an input image sequence, or alternatively a set of point trajectories for the images in a sequence. The selection module 1910 may analyze the input and, based on one or more characteristics of the image sequence, select a rotation-based SFM technique, a plane-based SFM technique, or a general 3D SFM technique as the appropriate reconstruction technique for the particular image sequence. The module that implements the selected reconstruction technique (the rotation-based SFM module 1920, plane-based SFM module 1930, or general 3D SFM module 1940) is then applied to generate estimates of camera parameters and camera motion for the image sequence.

Example Applications

Example applications of the SFM techniques as described herein may include one or more of, but are not limited to, video stabilization, video augmentation (augmenting an original video sequence with graphic objects), video classification, and robot navigation. In general, embodiments of one or more of the SFM techniques may be used to provide structure and motion to any application that requires or desires such output to perform some video- or image-processing task.

Example System

Embodiments of the various techniques as described herein including the reconstruction techniques for generating structure, camera parameters, and motion from point trajectories may be executed on one or more computer systems, which may interact with various other devices. One such computer system is illustrated by FIG. 8. In different embodiments, computer system 2000 may be any of various types of devices, including, but not limited to, a personal computer system, desktop computer, laptop, notebook, or netbook computer, mainframe computer system, handheld computer, workstation, network computer, a camera, a video camera, a tablet or pad device, a smart phone, a set top box, a mobile device, a consumer device, video game console, handheld video game device, application server, storage device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, display(s) 2080, and touch- or multitouch-enabled device(s) 2090. In some embodiments, it is contemplated that embodiments may be implemented using a single instance of computer system 2000, while in other embodiments multiple such systems, or multiple nodes making up computer system 2000, may be configured to host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, be implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may be configured to store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the various techniques as described herein are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a computer-accessible medium may include storage media or memory media such as magnetic or optical media, e.g., disk or CD/DVD-ROM coupled to computer system 2000 via I/O interface 2030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 8, memory 2020 may include program instructions 2025, configured to implement embodiments of the various techniques as described herein, and data storage 2035, comprising various data accessible by program instructions 2025. In one embodiment, program instructions 2025 may include software elements of embodiments of the various techniques as illustrated in the above Figures. Data storage 2035 may include data that may be used in embodiments. In other embodiments, other or different software elements and data may be included.

Those skilled in the art will appreciate that computer system 2000 is merely illustrative and is not intended to limit the scope of the various techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a video camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    performing, by one or more computing devices operations comprising:
        obtaining a plurality of point trajectories for an image sequence comprising a plurality of frames, each point trajectory tracking a feature across two or more of the frames;
        selecting, according to the point trajectories, a particular reconstruction technique from among a plurality of different reconstruction techniques for reconstructing camera motion for the image sequence; and
        generating a reconstruction of camera motion for the image sequence according to the selected reconstruction technique.

2. The method as recited in claim 1, wherein the plurality of different reconstruction techniques include:
    a rotation-based reconstruction technique that estimates a rotation component of camera motion for an image sequence in which a translation component of the camera motion is zero or near zero;
    a plane-based reconstruction technique that estimates camera motion for an image sequence that includes a dominant plane and in which the translation component of the camera motion is non-zero; and
    a general reconstruction technique that estimates camera motion for an image sequence that does not include a dominant plane and in which the translation component of the camera motion is non-zero.

3. The method as recited in claim 1, wherein selecting the particular reconstruction technique from among the plurality of different reconstruction techniques comprises:
    checking the image sequence according to the point trajectories to determine if the image sequence meets requirements of a rotation-based reconstruction technique that estimates a rotation component of camera motion for the image sequence;
    if the image sequence meets the requirements of the rotation-based reconstruction technique, selecting the rotation-based reconstruction technique;
    if the image sequence does not meet the requirements of the rotation-based reconstruction technique, checking the image sequence according to the point trajectories to determine if the sequence meets requirements of a plane-based reconstruction technique that estimates camera motion for the image sequence according to a dominant plane in the image sequence;
    if the image sequence meets the requirements of the plane-based reconstruction technique, selecting the plane-based reconstruction technique;
    if the image sequence does not meet the requirements of the rotation-based reconstruction technique or the plane-based reconstruction technique, selecting a general reconstruction technique that estimates camera motion for the image sequence.

4. The method as recited in claim 1, wherein selecting the particular reconstruction technique from among the plurality of different reconstruction techniques comprises:
    determining, according to the point trajectories, that the image sequence meets requirements of a rotation-based reconstruction technique that estimates a rotation component of camera motion for the image sequence, wherein the requirements include that a translation component of camera motion for the image sequence is zero or near zero; and
    selecting the rotation-based reconstruction technique in response to said determining.

5. The method as recited in claim 1, wherein selecting the particular reconstruction technique from among the plurality of different reconstruction techniques comprises:
    determining, according to the point trajectories, that the image sequence meets requirements of a plane-based reconstruction technique that estimates camera motion for the image sequence according to a dominant plane in the image sequence, wherein the requirements include that the image sequence includes a dominant plane; and
    selecting the plane-based reconstruction technique in response to said determining.

6. The method as recited in claim 1, wherein selecting the particular reconstruction technique from among the plurality of different reconstruction techniques comprises:
    determining, according to the point trajectories, that the image sequence meets requirements of a general reconstruction technique that estimates camera motion for the image sequence, wherein the requirements include that the image sequence does not include a dominant plane and that a translation component of camera motion for the image sequence is non-zero; and
    selecting the general reconstruction technique in response to said determining.

7. The method as recited in claim 1, wherein selecting the particular reconstruction technique from among the plurality of different reconstruction techniques comprises:
    selecting one or more pairs of frames from the image sequence;
    for each selected pair of frames:
        performing a two-view reconstruction of camera motion for the pair of frames; and analyzing the two-view reconstruction according to one or more of the point trajectories to determine if the pair of frames meet camera motion requirements for the particular reconstruction technique; and selecting the particular reconstruction technique upon determining that the selected one or more pairs of frames each meets the requirements for the particular reconstruction technique.

8. A system, comprising:

one or more processors; and a computer-readable medium comprising program instructions stored thereon, the program instructions are executable by at least one of the one or more processors to perform operations comprising:

obtain a plurality of point trajectories for an image sequence comprising a plurality of frames, each point trajectory tracking a feature across two or more of the frames;

selecting, according to the point trajectories, a particular reconstruction technique from among a plurality of different reconstruction techniques for reconstructing camera motion for the image sequence; and generating a reconstruction of camera motion for the image sequence according to the selected reconstruction technique.

9. The system as recited in claim 8, wherein the plurality of different reconstruction techniques include:

a rotation-based reconstruction technique that estimates a rotation component of camera motion for an image sequence in which a translation component of the camera motion is zero or near zero;

a plane-based reconstruction technique that estimates camera motion for an image sequence that includes a dominant plane and in which the translation component of the camera motion is non-zero; and a general reconstruction technique that estimates camera motion for an image sequence that does not include a dominant plane and in which the translation component of the camera motion is non-zero.

10. The system as recited in claim 8, wherein, to select the particular reconstruction technique from among the plurality of different reconstruction techniques, the program instructions are executable by at least one of the one or more processors to:

check the image sequence according to the point trajectories to determine if the image sequence meets requirements of a rotation-based reconstruction technique that estimates a rotation component of camera motion for the image sequence;

if the image sequence meets the requirements of the rotation-based reconstruction technique, select the rotation-based reconstruction technique;

if the image sequence does not meet the requirements of the rotation-based reconstruction technique, check the image sequence according to the point trajectories to determine if the sequence meets requirements of a plane-based reconstruction technique that estimates camera motion for the image sequence according to a dominant plane in the image sequence;

if the image sequence meets the requirements of the plane-based reconstruction technique, select the plane-based reconstruction technique;

if the image sequence does not meet the requirements of the rotation-based reconstruction technique or the plane-based reconstruction technique, select a general reconstruction technique that estimates camera motion for the image sequence.

11. The system as recited in claim 8, wherein, to select the particular reconstruction technique from among the plurality of different reconstruction techniques, the program instructions are executable by at least one of the one or more processors to:

determine, according to the point trajectories, that the image sequence meets requirements of a rotation-based reconstruction technique that estimates a rotation component of camera motion for the image sequence, wherein the requirements include that a translation component of camera motion for the image sequence is zero or near zero; and select the rotation-based reconstruction technique in response to said determining.

12. The system as recited in claim 8, wherein, to select the particular reconstruction technique from among the plurality of different reconstruction techniques, the program instructions are executable by at least one of the one or more processors to:

determine, according to the point trajectories, that the image sequence meets requirements of a plane-based reconstruction technique that estimates camera motion for the image sequence according to a dominant plane in the image sequence, wherein the requirements include that the image sequence includes a dominant plane; and select the plane-based reconstruction technique in response to said determining.

13. The system as recited in claim 8, wherein, to select the particular reconstruction technique from among the plurality of different reconstruction techniques, the program instructions are executable by at least one of the one or more processors to:

determine, according to the point trajectories, that the image sequence meets requirements of a general reconstruction technique that estimates camera motion for the image sequence, wherein the requirements include that the image sequence does not include a dominant plane and that a translation component of camera motion for the image sequence is non-zero; and select the general reconstruction technique in response to said determining.

14. The system as recited in claim 8, wherein, to select the particular reconstruction technique from among the plurality of different reconstruction techniques, the program instructions are executable by at least one of the one or more processors to:

select one or more pairs of frames from the image sequence;

for each selected pair of frames:
perform a two-view reconstruction of camera motion for the pair of frames; and
analyze the two-view reconstruction according to one or more of the point trajectories to determine if the pair of frames meet camera motion requirements for the particular reconstruction technique; and select the particular reconstruction technique upon determining that the selected one or more pairs of frames each meets the requirements for the particular reconstruction technique.

15. A non-transitory computer-readable storage medium storing program instructions, wherein the program instructions are computer-executable to implement a structure from motion (SFM) module operable to:

obtain a plurality of point trajectories for an image sequence comprising a plurality of frames, each point trajectory tracking a feature across two or more of the frames;

select, according to the point trajectories, a particular reconstruction technique from among a plurality of different reconstruction techniques for reconstructing camera motion for the image sequence; and generate a reconstruction of camera motion for the image sequence according to the selected reconstruction technique.

16. The non-transitory computer-readable storage medium as recited in claim 15, wherein the plurality of different reconstruction techniques include:

a rotation-based reconstruction technique that estimates a rotation component of camera motion for an image sequence in which a translation component of the camera motion is zero or near zero;

a plane-based reconstruction technique that estimates camera motion for an image sequence that includes a dominant plane and in which the translation component of the camera motion is non-zero; and a general reconstruction technique that estimates camera motion for an image sequence that does not include a dominant plane and in which the translation component of the camera motion is non-zero.

17. The non-transitory computer-readable storage medium as recited in claim 15, wherein, to select the particular reconstruction technique from among the plurality of different reconstruction techniques, the SFM module is operable to:

check the image sequence according to the point trajectories to determine if the image sequence meets requirements of a rotation-based reconstruction technique that estimates a rotation component of camera motion for the image sequence;

if the image sequence meets the requirements of the rotation-based reconstruction technique, select the rotation-based reconstruction technique;

if the image sequence does not meet the requirements of the rotation-based reconstruction technique, check the image sequence according to the point trajectories to determine if the sequence meets requirements of a plane-based reconstruction technique that estimates camera motion for the image sequence according to a dominant plane in the image sequence;

if the image sequence meets the requirements of the plane-based reconstruction technique, select the plane-based reconstruction technique;

if the image sequence does not meet the requirements of the rotation-based reconstruction technique or the plane-based reconstruction technique, select a general reconstruction technique that estimates camera motion for the image sequence.

18. The non-transitory computer-readable storage medium as recited in claim 15, wherein, to select the particular reconstruction technique from among the plurality of different reconstruction techniques, the SFM module is operable to:

determine, according to the point trajectories, that the image sequence meets requirements of a rotation-based reconstruction technique that estimates a rotation component of camera motion for the image sequence, wherein the requirements include that a translation component of camera motion for the image sequence is zero or near zero; and select the rotation-based reconstruction technique in response to said determining.

19. The non-transitory computer-readable storage medium as recited in claim 15, wherein, to select the particular reconstruction technique from among the plurality of different reconstruction techniques, the SFM module is operable to:

determine, according to the point trajectories, that the image sequence meets requirements of a plane-based reconstruction technique that estimates camera motion for the image sequence according to a dominant plane in the image sequence, wherein the requirements include that the image sequence includes a dominant plane; and select the plane-based reconstruction technique in response to said determining.

20. The non-transitory computer-readable storage medium as recited in claim 15, wherein, to select the particular reconstruction technique from among the plurality of different reconstruction techniques, the SFM module is operable to:

determine, according to the point trajectories, that the image sequence meets requirements of a general reconstruction technique that estimates camera motion for the image sequence, wherein the requirements include that the image sequence does not include a dominant plane and that a translation component of camera motion for the image sequence is non-zero; and select the general reconstruction technique in response to said determining.

21. The non-transitory computer-readable storage medium as recited in claim 15, wherein, to select the particular reconstruction technique from among the plurality of different reconstruction techniques, the SFM module is operable to:

select one or more pairs of frames from the image sequence;

for each selected pair of frames:
perform a two-view reconstruction of camera motion for the pair of frames; and
analyze the two-view reconstruction according to one or more of the point trajectories to determine if the pair of frames meet camera motion requirements for the particular reconstruction technique; and select the particular reconstruction technique upon determining that the selected one or more pairs of frames each meets the requirements for the particular reconstruction technique.

* * * * *